United States Patent
Oka et al.

(10) Patent No.: US 11,358,599 B2
(45) Date of Patent: Jun. 14, 2022

(54) TRAVELING CONTROL APPARATUS, TRAVELING CONTROL METHOD, AND NON-TRANSITORY COMPUTER-READABLE STORAGE MEDIUM STORING PROGRAM

(71) Applicant: HONDA MOTOR CO., LTD., Tokyo (JP)

(72) Inventors: Keisuke Oka, Wako (JP); Takayasu Kumano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/823,266

(22) Filed: Mar. 18, 2020

(65) Prior Publication Data
US 2020/0307597 A1    Oct. 1, 2020

(30) Foreign Application Priority Data
Mar. 25, 2019 (JP) .............................. JP2019-057022

(51) Int. Cl.
*B60W 30/18* (2012.01)
*B60W 30/16* (2020.01)
(Continued)

(52) U.S. Cl.
CPC .. *B60W 30/18163* (2013.01); *B60W 30/0956* (2013.01); *B60W 30/162* (2013.01);
(Continued)

(58) Field of Classification Search
CPC ....... B60W 30/18163; B60W 30/0956; B60W 30/162; B60W 40/04; B60W 2554/4041;
(Continued)

(56) References Cited

U.S. PATENT DOCUMENTS 10,290,214 B2  5/2019 Zhang
10,953,881 B2  3/2021 Ma et al.
(Continued)

FOREIGN PATENT DOCUMENTS

CA    3036160 A1 *  3/2018  ............. B60K 31/00
JP    4882957 B2    2/2012
(Continued)

OTHER PUBLICATIONS

U.S. Appl. No. 16/823,270, filed Mar. 18, 2020 (this is an application that is related to the present application).
(Continued)

*Primary Examiner* — Peter D Nolan
*Assistant Examiner* — Demetra R Smith-Stewart
(74) *Attorney, Agent, or Firm* — Thomas | Horstemeyer, LLP

(57) ABSTRACT

A first specifying unit specifies a first possible space, for which a lane change of a vehicle is possible, from an inter-vehicle distance between a first preceding other vehicle and the vehicle, a speed of the first preceding other vehicle, and a speed of the vehicle. A second specifying unit specifies a second possible space, for which the lane change of the vehicle is possible, from an inter-vehicle distance between a second preceding other vehicle and a following other vehicle, a speed of the second preceding other vehicle, and a speed of the following other vehicle. A judgment unit judges, based on the first possible space and the second possible space, whether the lane change of the vehicle is possible.

27 Claims, 11 Drawing Sheets

(51) Int. Cl.
  *B60W 30/095* (2012.01)
  *B60W 40/04* (2006.01)
  *G08G 1/16* (2006.01)
  *G06K 9/00* (2022.01)
  *G06V 20/58* (2022.01)

(52) U.S. Cl.
  CPC ............ *B60W 40/04* (2013.01); *G06V 20/58* (2022.01); *G06V 20/584* (2022.01); *G08G 1/167* (2013.01); *B60W 2554/4041* (2020.02); *B60W 2554/802* (2020.02); *B60W 2554/804* (2020.02)

(58) Field of Classification Search
  CPC ...... B60W 2554/804; B60W 2554/802; G06V 20/584; G06V 20/58; G08G 1/167
  See application file for complete search history.

(56) References Cited

U.S. PATENT DOCUMENTS

| 11,066,073 B2 | 7/2021 | Ishioka | |
|---|---|---|---|
| 2017/0259819 A1* | 9/2017 | Takeda | B60W 10/04 |
| 2018/0170388 A1* | 6/2018 | Shin | G05D 1/0088 |
| 2018/0201272 A1* | 7/2018 | Takeda | B60W 10/184 |
| 2018/0222423 A1* | 8/2018 | Takae | B60R 21/00 |
| 2018/0293894 A1 | 10/2018 | Zhang | |
| 2018/0348757 A1* | 12/2018 | Mimura | G05D 1/0061 |
| 2019/0016339 A1 | 1/2019 | Ishioka | |
| 2019/0071075 A1* | 3/2019 | Mimura | G08G 1/16 |
| 2019/0071093 A1 | 3/2019 | Ma et al. | |
| 2019/0092333 A1 | 3/2019 | Ishioka | |
| 2019/0126927 A1* | 5/2019 | Uejima | B60K 28/06 |
| 2019/0143972 A1* | 5/2019 | Ishioka | G06V 20/588 701/70 |
| 2020/0189596 A1* | 6/2020 | Kang | G05D 1/0088 |

FOREIGN PATENT DOCUMENTS

| JP | 2014-019332 A | 2/2014 |
|---|---|---|
| WO | 2017/141765 A1 | 8/2017 |
| WO | 2017/159509 A1 | 9/2017 |
| WO | 2018/163349 A1 | 9/2018 |

OTHER PUBLICATIONS

U.S. Appl. No. 16/823,272, filed Mar. 18, 2020 (this is an application that is related to the present application).
Office Action for U.S. Appl. No. 16/823,270 dated Sep. 17, 2021.
Office Action for U.S. Appl. No. 16/823,272 dated Mar. 24, 2022.

* cited by examiner

TRAVELING CONTROL APPARATUS, TRAVELING CONTROL METHOD, AND NON-TRANSITORY COMPUTER-READABLE STORAGE MEDIUM STORING PROGRAM

CROSS-REFERENCE TO RELATED APPLICATION(S)

This application claims priority to and the benefit of Japanese Patent Application No. 2019-057022 filed on Mar. 25, 2019, the entire disclosure of which is incorporated herein by reference.

BACKGROUND OF THE INVENTION

Field of the Invention

The present invention relates to a traveling control apparatus for controlling traveling of a vehicle, a traveling control method, and a non-transitory computer-readable storage medium storing a program.

Description of the Related Art

In recent years, techniques of automatically controlling traveling of a vehicle are known. A technique of performing a lane change is one of them. International Publication No. 2017/141765 describes that if a preceding traveling vehicle that is traveling ahead a self-vehicle on a lane on which the self-vehicle is traveling, and a preceding reference vehicle and a following reference vehicle which are traveling on an adjacent lane exist as peripheral vehicles traveling on the periphery of the self-vehicle, a lane change is made to a target set between the preceding reference vehicle and the following reference vehicle in consideration of the future positions of the peripheral vehicles.

However, when performing a lane change, an influence of another vehicle or an influence on another vehicle needs to be taken into consideration, and there is demand for further improvement.

SUMMARY OF THE INVENTION

The present invention provides a traveling control apparatus for controlling traveling of a vehicle to appropriately perform a lane change based on an influence on/from another vehicle, a traveling control method, and a non-transitory computer-readable storage medium storing a program.

The present invention in its first aspect provides a traveling control apparatus comprising: an acquisition unit configured to acquire information outside a vehicle; a control unit configured to control traveling of the vehicle based on the information outside the vehicle, which is acquired by the acquisition unit; a first specifying unit configured to, if the acquisition unit acquires, as the information outside the vehicle, information of a first preceding other vehicle that is a vehicle traveling on a traveling lane of the vehicle and is traveling ahead the vehicle, specify a first possible space, for which a lane change of the vehicle is possible, from an inter-vehicle distance between the first preceding other vehicle and the vehicle, a speed of the first preceding other vehicle, and a speed of the vehicle; a second specifying unit configured to, if the acquisition unit acquires, as the information outside the vehicle, information of a following other vehicle that is a vehicle traveling on an adjacent lane different from the traveling lane of the vehicle and is traveling behind the vehicle and information of a second preceding other vehicle traveling ahead the vehicle and the following other vehicle, specify a second possible space, for which the lane change of the vehicle is possible, from an inter-vehicle distance between the second preceding other vehicle and the following other vehicle, a speed of the second preceding other vehicle, and a speed of the following other vehicle; and a judgment unit configured to judge, based on the first possible space specified by the first specifying unit and the second possible space specified by the second specifying unit, whether the lane change of the vehicle is possible.

The present invention in its second aspect provides a traveling control method executed by a traveling control apparatus, comprising: acquiring information outside a vehicle; controlling traveling of the vehicle based on the acquired information outside the vehicle; if information of a first preceding other vehicle that is a vehicle traveling on a traveling lane of the vehicle and is traveling ahead the vehicle is acquired as the information outside the vehicle, specifying a first possible space, for which a lane change of the vehicle is possible, from an inter-vehicle distance between the first preceding other vehicle and the vehicle, a speed of the first preceding other vehicle, and a speed of the vehicle; if information of a following other vehicle that is a vehicle traveling on an adjacent lane different from the traveling lane of the vehicle and is traveling behind the vehicle and information of a second preceding other vehicle traveling ahead the vehicle and the following other vehicle are acquired as the information outside the vehicle, specifying a second possible space, for which the lane change of the vehicle is possible, from an inter-vehicle distance between the second preceding other vehicle and the following other vehicle, a speed of the second preceding other vehicle, and a speed of the following other vehicle; and judging, based on the specified first possible space and the specified second possible space, whether the lane change of the vehicle is possible.

The present invention in its third aspect provides a non-transitory computer-readable storage medium storing a program configured to cause a computer to function to: acquire information outside a vehicle; control traveling of the vehicle based on the acquired information outside the vehicle; if information of a first preceding other vehicle that is a vehicle traveling on a traveling lane of the vehicle and is traveling ahead the vehicle is acquired as the information outside the vehicle, specify a first possible space, for which a lane change of the vehicle is possible, from an inter-vehicle distance between the first preceding other vehicle and the vehicle, a speed of the first preceding other vehicle, and a speed of the vehicle; if information of a following other vehicle that is a vehicle traveling on an adjacent lane different from the traveling lane of the vehicle and is traveling behind the vehicle and information of a second preceding other vehicle traveling ahead the vehicle and the following other vehicle are acquired as the information outside the vehicle, specify a second possible space, for which the lane change of the vehicle is possible, from an inter-vehicle distance between the second preceding other vehicle and the following other vehicle, a speed of the second preceding other vehicle, and a speed of the following other vehicle; and judge, based on the specified first possible space and the specified second possible space, whether the lane change of the vehicle is possible.

According to the present invention, it is possible to control traveling of a vehicle to appropriately perform a lane change based on an influence on/from another vehicle.

DESCRIPTION OF THE EMBODIMENTS

Figure 1:
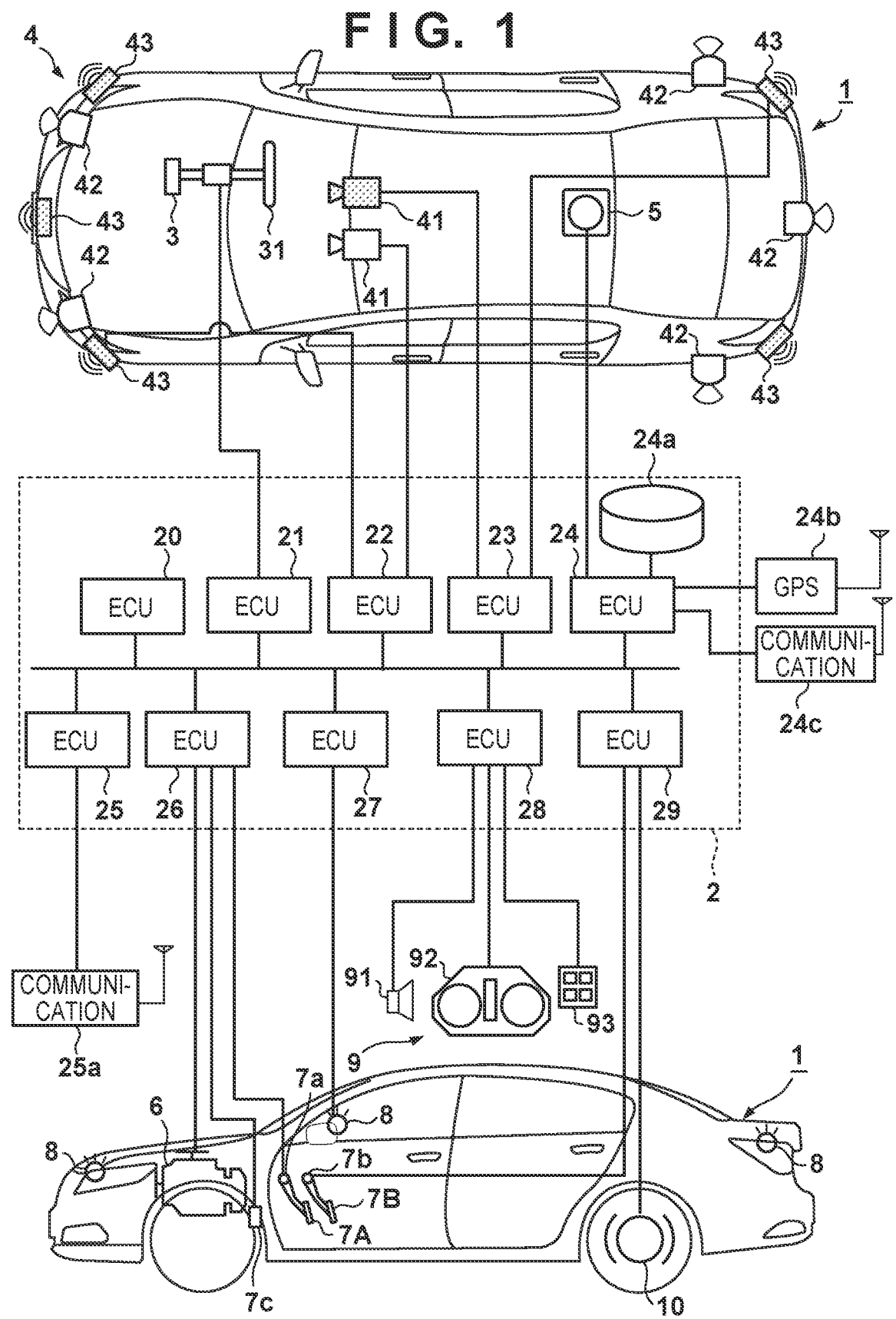
FIG. 1 is a view showing the arrangement of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle control apparatus (traveling control apparatus) according to an embodiment of the present invention, and a vehicle 1 is controlled. FIG. 1 shows the outline of the vehicle 1 by a plan view and a side view. The vehicle 1 is, for example, a sedan-type four-wheeled vehicle.

The traveling control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, the arrangement of the traveling control apparatus shown in FIG. 1 can be a computer configured to execute the present invention concerning a program.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, for example, the contour of a target or a division line (a white line or the like) of a lane on a road can be extracted.

The detection unit 42 is Light Detection and Ranging (LIDAR), and detects a target around the vehicle 1 or measures the distance to a target. In this embodiment, five detection units 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each detection unit 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information, traffic information, and meteorological information and acquires these pieces of information. The ECU 24 can access a map information database 24a formed in the storage device. The ECU 24 searches for a route from the current position to the destination. Note that databases for the above-described traffic information, meteorological information, and the like may be formed in the database 24a.

The ECU 25 includes a communication device 25a for inter-vehicle communication. The communication device 25a performs wireless communication with another vehicle on the periphery and performs information exchange between the vehicles. The communication device 25*a* has various kinds of functions, and has, for example, a DSRC (Dedicated Short Range Communication) function and a cellular communication function. The communication device 25*a* may be formed as a TCU (Telematics Communication Unit) including a transmission/reception antenna.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7*a* provided on an accelerator pedal 7A, or switches the gear ratio of the transmission based on information such as a vehicle speed detected by a vehicle speed sensor 7*c*. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. In addition, the display device 92 may include a navigation device.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7*b* provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Control concerning automated driving of the vehicle 1 executed by the ECU 20 will be described. When the driver instructs a destination and automated driving, the ECU 20 automatically controls traveling of the vehicle 1 to the destination in accordance with a guidance route searched by the ECU 24. In the automatic control, the ECU 20 acquires information (outside information) concerning the peripheral state of the vehicle 1 from the ECUs 22 and 23, and controls steering and acceleration/deceleration of the vehicle 1 by issuing instructions to the ECUs 21, 26, and 29 based on the acquired information.

Figure 2:
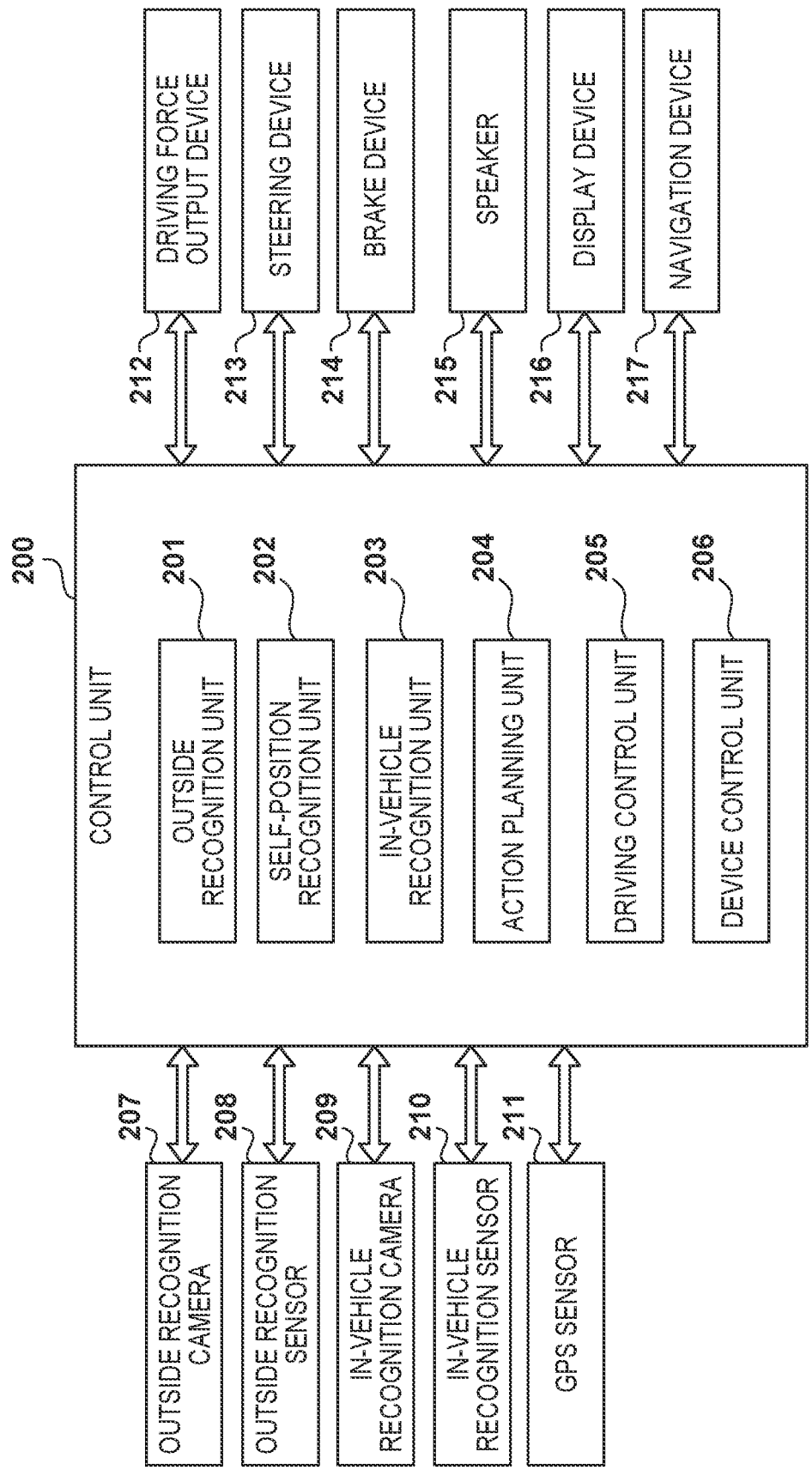
FIG. 2 is a block diagram showing the functional blocks of a control unit.

FIG. 2 is a block diagram showing the functional blocks of the control unit 2. A control unit 200 corresponds to the control unit 2 shown in FIG. 1, and includes an outside recognition unit 201, a self-position recognition unit 202, an in-vehicle recognition unit 203, an action planning unit 204, a driving control unit 205, and a device control unit 206. Each block is implemented by one or a plurality of ECUs shown in FIG. 1.

The outside recognition unit 201 recognizes the outside information of the vehicle 1 based on signals from an outside recognition camera 207 and an outside recognition sensor 208. Here, the outside recognition camera 207 corresponds to, for example, the camera 41 shown in FIG. 1, and the outside recognition sensor 208 corresponds to, for example, the detection units 42 and 43 shown in FIG. 1. The outside recognition unit 201 recognizes, for example, a scene such as an intersection, a railroad crossing, or a tunnel, a free space such as a road shoulder, and the behavior (the speed, the direction of travel, and the like) of another vehicle based on the signals from the outside recognition camera 207 and the outside recognition sensor 208. The self-position recognition unit 202 recognizes the current position of the vehicle 1 based on a signal from a GPS sensor 211. Here, the GPS sensor 211 corresponds to, for example, the GPS sensor 24*b* shown in FIG. 1.

The in-vehicle recognition unit 203 identifies the occupant of the vehicle 1 based on signals from an in-vehicle recognition camera 209 and an in-vehicle recognition sensor 210 and recognizes the state of the occupant. The in-vehicle recognition camera 209 is, for example, a near infrared camera installed on the display device 92 inside the vehicle 1, and, for example, detects the direction of the sight line of the occupant. In addition, the in-vehicle recognition sensor 210 is, for example, a sensor configured to detect a biological signal of the occupant. The in-vehicle recognition unit 203 recognizes a drowsy state of the occupant, a working state other than driving, or the like based on the signals.

The action planning unit 204 plans an action of the vehicle 1 such as an optimum route or a risk avoiding route based on the results of recognition by the outside recognition unit 201 and the self-position recognition unit 202. The action planning unit 204, for example, performs entering determination based on the start point or end point of an intersection, a railroad crossing, or the like, and makes an action plan based on a prediction result of the behavior of another vehicle. The driving control unit 205 controls a driving force output device 212, a steering device 213, and a brake device 214 based on the action plan made by the action planning unit 204. Here, the driving force output device 212 corresponds to, for example, the power plant 6 shown in FIG. 1, the steering device 213 corresponds to the electric power steering device 3 shown in FIG. 1, and the brake device 214 corresponds to the brake device 10.

The device control unit 206 controls devices connected to the control unit 200. For example, the device control unit 206 controls a speaker 215 to make it output a predetermined voice message such as a message for a warning or navigation. In addition, the device control unit 206 controls a display device 216 to make it display a predetermined interface screen. The display device 216 corresponds to, for example, the display device 92. Additionally, for example, the device control unit 206 controls a navigation device 217 to acquire setting information in the navigation device 217.

The control unit 200 may include a functional block other than those shown in FIG. 2, and may include, for example, an optimum route calculation unit configured to calculate an optimum route to a destination based on map information acquired via the communication device 24c. The control unit 200 may acquire information from a device other than the cameras and the sensors shown in FIG. 2, and may, for example, acquire the information of another vehicle via the communication device 25a. In addition, the control unit 200 receives detection signals not only from the GPS sensor 211 but also from various kinds of sensors provided in the vehicle 1. For example, the control unit 200 receives a detection signal from a door open/close sensor or a door lock mechanism sensor provided in a door portion of the vehicle 1 via an ECU formed in the door portion. The control unit 200 can thus detect unlock of the door or a door opening/closing operation.

Figure 3:
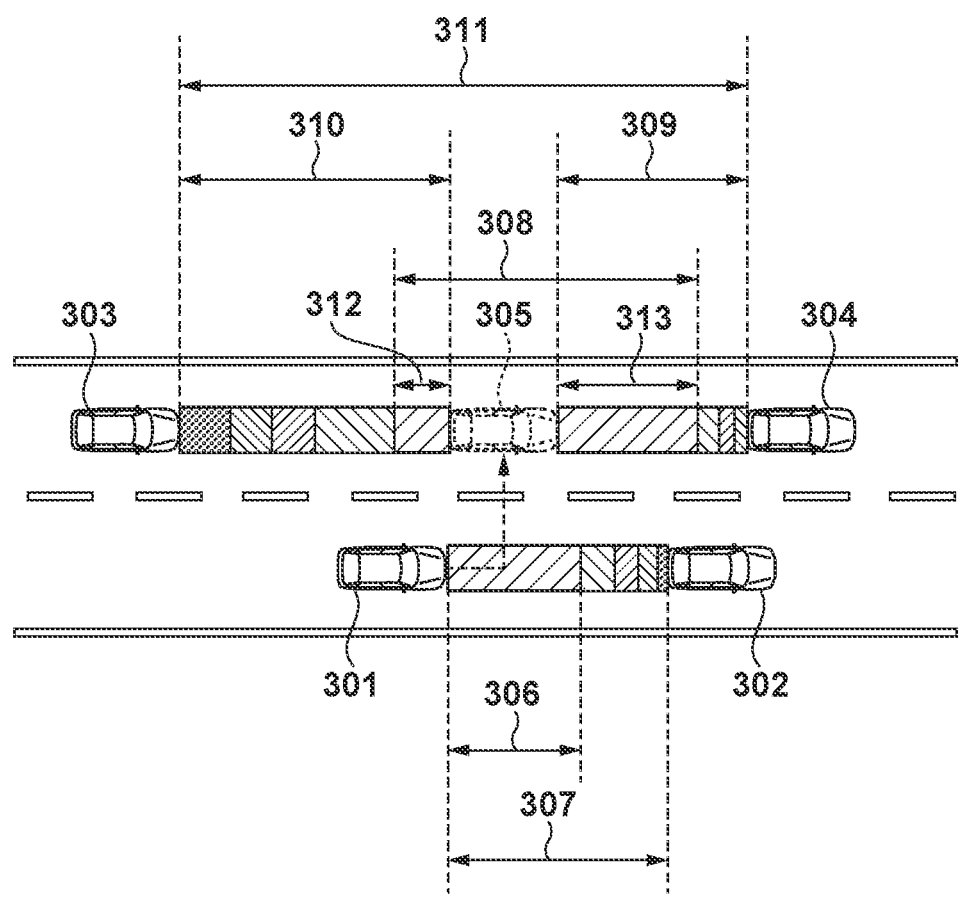
FIG. 3 is a view for explaining an entering operation between vehicles by a lane change.

FIG. 3 is a view for explaining an entering operation between vehicles by a lane change according to this embodiment. Referring to FIG. 3, a self-vehicle 301 is traveling at Ve on a self-lane. A vehicle 302 is a preceding other vehicle that is traveling at a speed Vf0 on the self-lane ahead the self-vehicle 301. A vehicle 303 is a following other vehicle that is traveling at a speed Vr on an adjacent lane behind the self-vehicle 301. A vehicle 304 is a preceding other vehicle that is traveling at a speed Vf on the adjacent lane ahead the self-vehicle 301. This embodiment assumes a scene in which the self-vehicle 301 makes a lane change (LC) by accelerating from the self-lane to the adjacent lane in such a positional relationship of the vehicles. If a lane change is performed in such a scene, the self-vehicle 301 enters the inter-vehicle region between the vehicle 303 and the vehicle 304, which is set as a target. A position 305 represents an estimated future position of the self-vehicle 301 in the inter-vehicle region between the vehicle 303 and the vehicle 304 in such a case. The estimated future position is decided based on, for example, a time at which a predetermined lane change is necessary. For example, if turn signal lighting is needed to be presented 3 sec before a lane change, the time at which a predetermined lane change is necessary is, for example, 3 sec after turn signal lighting. Note that a "position" of a vehicle in this embodiment represents not an absolute position defined by a latitude and a longitude or the like but a relative position between vehicles.

In this embodiment, the position where the self-vehicle 301 actually enters is decided using an acceleration/deceleration prediction map based on an IDM model. The position where the self-vehicle actually enters will also be referred to as an LC (Lane Change) position hereinafter.

Figure 7:
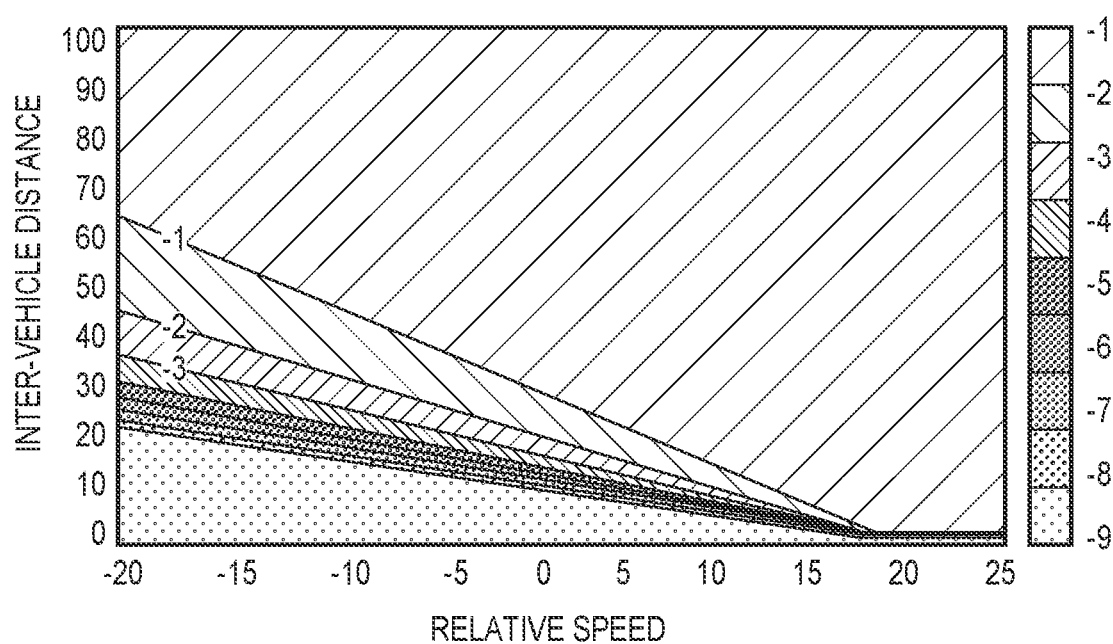
FIG. 7 is a view showing an acceleration/deceleration prediction map.

The acceleration/deceleration prediction map will be described here. FIG. 7 is a view showing an example of the acceleration/deceleration prediction map. The acceleration/deceleration prediction map is based on a car-following model (IDM model: Intelligent Driver Model) for two vehicles, that is, a preceding vehicle and a following vehicle that follows it. In the IDM model, it is known that an acceleration/deceleration α of a following vehicle, which occurs due to the presence of a preceding vehicle, is given by $$\alpha = a\left[1 - \left(\frac{v}{v_0}\right)^\delta - \left(\frac{s^*(v, \Delta v)}{s}\right)^2\right] \quad (1)$$

where v is the speed of the preceding vehicle, v0 is the speed of the following vehicle, Δv is the relative speed, δ is an exponential constant, s is the inter-vehicle distance, and s* is the effective inter-vehicle distance. The third term of the right side of equation (1) is a term concerning the inter-vehicle distance and the relative speed, and represents the influence from another vehicle. The acceleration/deceleration α is decided based on the influence from the other vehicle. For example, if the speed relationship is given by speed of following vehicle>speed of preceding vehicle, the speed difference is large, and the inter-vehicle distance is short, the following vehicle receives the impact of the acceleration/deceleration α calculated from the relative speed and the inter-vehicle distance to obtain an optimum inter-vehicle distance, as can be seen.

The abscissa of FIG. 7 represents the relative speed between two vehicles, and the ordinate represents the inter-vehicle distance between two vehicles. In addition, the acceleration/deceleration α calculated by equation (1) is represented by the difference of hatching in FIG. 7. As for a change in the acceleration/deceleration α, although hatching boundaries are clearly shown in FIG. 7, they may change as a gradation. Note that the acceleration/deceleration α represented by hatching is decided by the absolute speed of the following vehicle. In FIG. 7, the distribution of accelerations/decelerations α of a vehicle is shown, based on the IDM model represented by equation (1), on a space defined by the two axes of the relative speed and the relative inter-vehicle distance between two vehicles. Note that the acceleration/deceleration α may be converted into a G value by defining, for example, −2000 mm/s2=−0.2 G.

Referring to FIG. 3, the hatching indication between the self-vehicle 301 and the vehicle 302 represents the distribution of the acceleration/deceleration α received by the self-vehicle 301 at an inter-vehicle distance 307 in a case in which the self-vehicle 301 and the vehicle 302 are considered as an IDM model. In particular, an LC possible space 306 indicated by a thick hatching in a backward diagonal direction represents that the magnitude of the acceleration/deceleration α received by the self-vehicle 301 is equal to or less than a predetermined value. For this reason, since the impact that the self-vehicle 301 receives from the vehicle 302 is relatively small, the self-vehicle 301 can smoothly perform a lane change to an LC possible space 308 to be described later as a target.

In addition, the hatching indication between the position 305 and the vehicle 304 represents the distribution of the acceleration/deceleration α received by the self-vehicle 301 at the future position in a case in which the self-vehicle 301 at the future position at, for example, the position 305 and the vehicle 304 are considered as an IDM model. In particular, a space indicated by a thick hatching in a backward diagonal direction represents that the magnitude of the acceleration/deceleration α received by the self-vehicle 301 at the future position is equal to or less than a predetermined value. For this reason, since the impact that the self-vehicle 301 at the future position receives from the vehicle 304 is relatively small, the self-vehicle 301 can smoothly perform a lane change to the LC possible space 308 as a target.

In addition, the hatching indication between the vehicle 303 and the position 305 represents the distribution of the acceleration/deceleration α received by the vehicle 303 in a case in which the vehicle 303 and the self-vehicle 301 at the future position at, for example, the position 305 are considered as an IDM model. In particular, a space indicated by a thick hatching in a backward diagonal direction represents that the magnitude of the acceleration/deceleration α received by the vehicle 303 is equal to or less than a predetermined value. For this reason, since the impact that the vehicle 303 receives from the self-vehicle 301 at the future position is relatively small, the self-vehicle 301 can smoothly perform a lane change to the LC possible space 308 as a target.

In this embodiment, the space where the LC possible space 306 and the LC possible space 308 overlap, that is, in FIG. 3, the position closest from the self-vehicle 301 in the LC possible space 306 is specified as the LC position where the self-vehicle 301 makes a lane change. If a lane change is performed at the specified position, all of the influence that the self-vehicle 301 receives from the vehicle 302, the influence that the self-vehicle 301 at the future position receives from the vehicle 304, and the influence that the self-vehicle 301 at the future position exerts on the vehicle 303 can be reduced, and a smooth lane change can be implemented.

Figure 4:
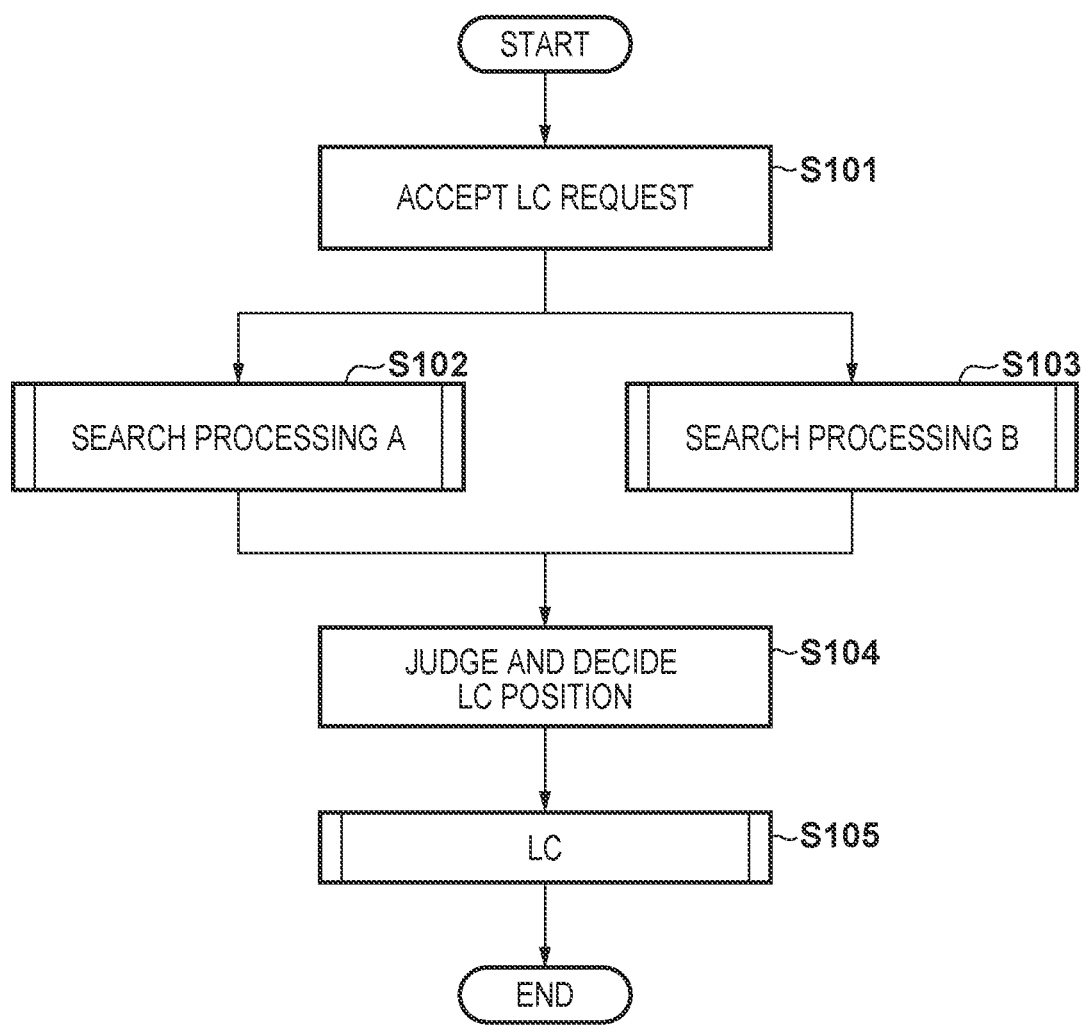
FIG. 4 is a flowchart showing processing of a lane change.

FIG. 4 is a flowchart showing processing of a lane change of the self-vehicle 301 according to this embodiment. Processing shown in FIG. 4 is implemented when, for example, the control unit 200 of the self-vehicle 301 reads out a program stored in a storage area such as a ROM and executes it. A description will be made below by referring to the control unit 200 of the self-vehicle 301 simply as the control unit 200 unless specified otherwise.

In step S101, the control unit 200 accepts a lane change request and, for example, lights a turn signal. After that, the processes of steps S102 and S103 are performed. In step S102, search processing A for searching for the LC possible space 308 is performed. In step S103, search processing B for searching for the LC possible space 306 is performed. Note that in this embodiment, a description will be made assuming that the search processing A of step S102 and the search processing B of step S103 are performed in parallel. However, the search processing B may be performed after the search processing A, or the search processing A may be performed after the search processing B.

Figure 5:
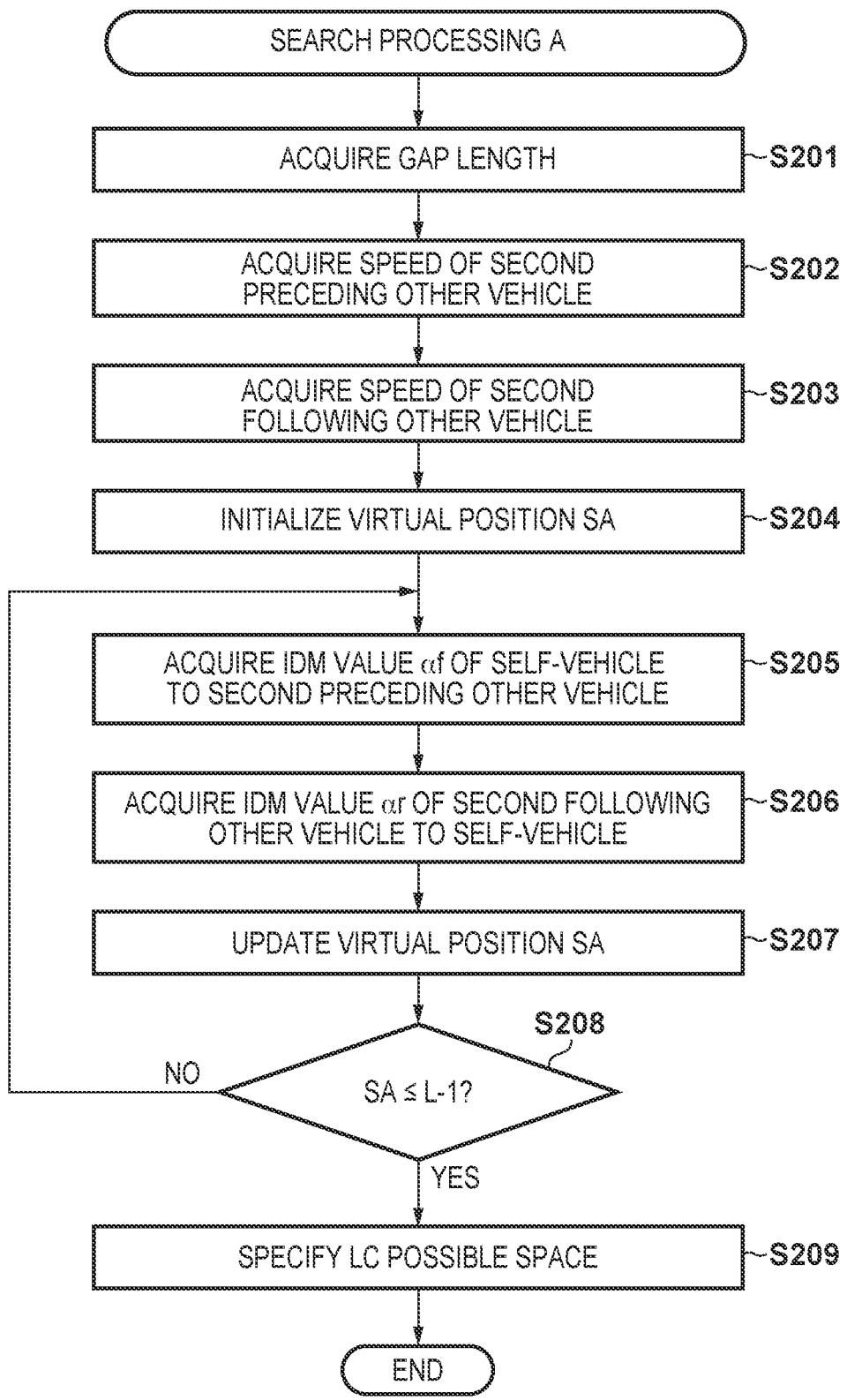
FIG. 5 is a flowchart showing search processing.

FIG. 5 is a flowchart showing the search processing A of step S102. In step S201, the control unit 200 acquires a gap length. Here, the gap length corresponds to an inter-vehicle distance 311 in FIG. 3. Note that in this embodiment, the inter-vehicle distances 307, 309, 310, and 311 and the LC possible spaces 306 and 308 represent distances along the traveling lane.

In step S202, the control unit 200 acquires the speed Vf of the second preceding other vehicle. Here, the second preceding other vehicle is the vehicle 304. In step S203, the control unit 200 acquires the speed Vr of the second following other vehicle. Here, the second following other vehicle is the vehicle 303. The control unit 200 acquires the speeds of the second preceding other vehicle and the second following other vehicle using, for example, the outside recognition camera 207 and the outside recognition sensor 208.

In step S204, the control unit 200 initializes a variable SA (virtual position SA) representing a virtual position (future position) upon estimating that the self-vehicle 301 has made a lane change to the adjacent lane. The position 305 in FIG. 3 represents one of virtual positions to be used in the processing shown in FIG. 5. The initial value of the virtual position SA is, for example, a position 1 m behind the second preceding vehicle (SA=1).

In step S205, the control unit 200 acquires an IDM value $\alpha f$ of the self-vehicle 301 at the virtual position SA with respect to the second preceding other vehicle. The IDM value is an example of the predicted acceleration/deceleration value of the following vehicle. In this embodiment, a description will be made using an IDM value obtained using an IDM model as an example. In step S205, the control unit 200 creates an IDM model based on, for example, the speed after acceleration for the lane change of the self-vehicle 301, obtains the IDM value $\alpha f$ from the relative speed and the inter-vehicle distance between the second preceding other vehicle and the self-vehicle 301 at the virtual position SA, and holds it in the storage area in association with the virtual position SA.

In step S206, the control unit 200 acquires an IDM value $\alpha r$ of the second following other vehicle with respect to the self-vehicle 301 at the virtual position SA. In step S206, the control unit 200 creates an IDM model based on, for example, the speed of the vehicle 303, obtains the IDM value $\alpha r$ from the relative speed and the inter-vehicle distance between the self-vehicle 301 at the virtual position SA and the second following other vehicle, and holds it in the storage area in association with the virtual position SA.

In step S207, the control unit 200 updates the virtual position SA. The virtual position SA may be, for example, incremented one by one. In step S208, the control unit 200 determines whether a predetermined condition is satisfied, for example, whether the updated virtual position SA satisfies "SA≤L−1". Here, L corresponds to the inter-vehicle distance 311 shown in FIG. 3. Upon determining that a predetermined condition is satisfied, the process advances to step S209. Upon determining that a predetermined condition is not satisfied, processing from step S205 is repeated.

In step S209, the control unit 200 specifies, as the LC possible space 308, a space including spaces 312 and 313 in which both the accelerations/decelerations $\alpha f$ and $\alpha r$ obtained for each virtual position SA have a magnitude equal to or less than a predetermined value (for example, 0.2 or less). That is, when the search processing A in FIG. 5 ends, a space in which the acceleration/deceleration has a predetermined value or less when accelerating and then making a lane change can be specified. After step S209, the processing shown in FIG. 5 is ended.

Figure 6:
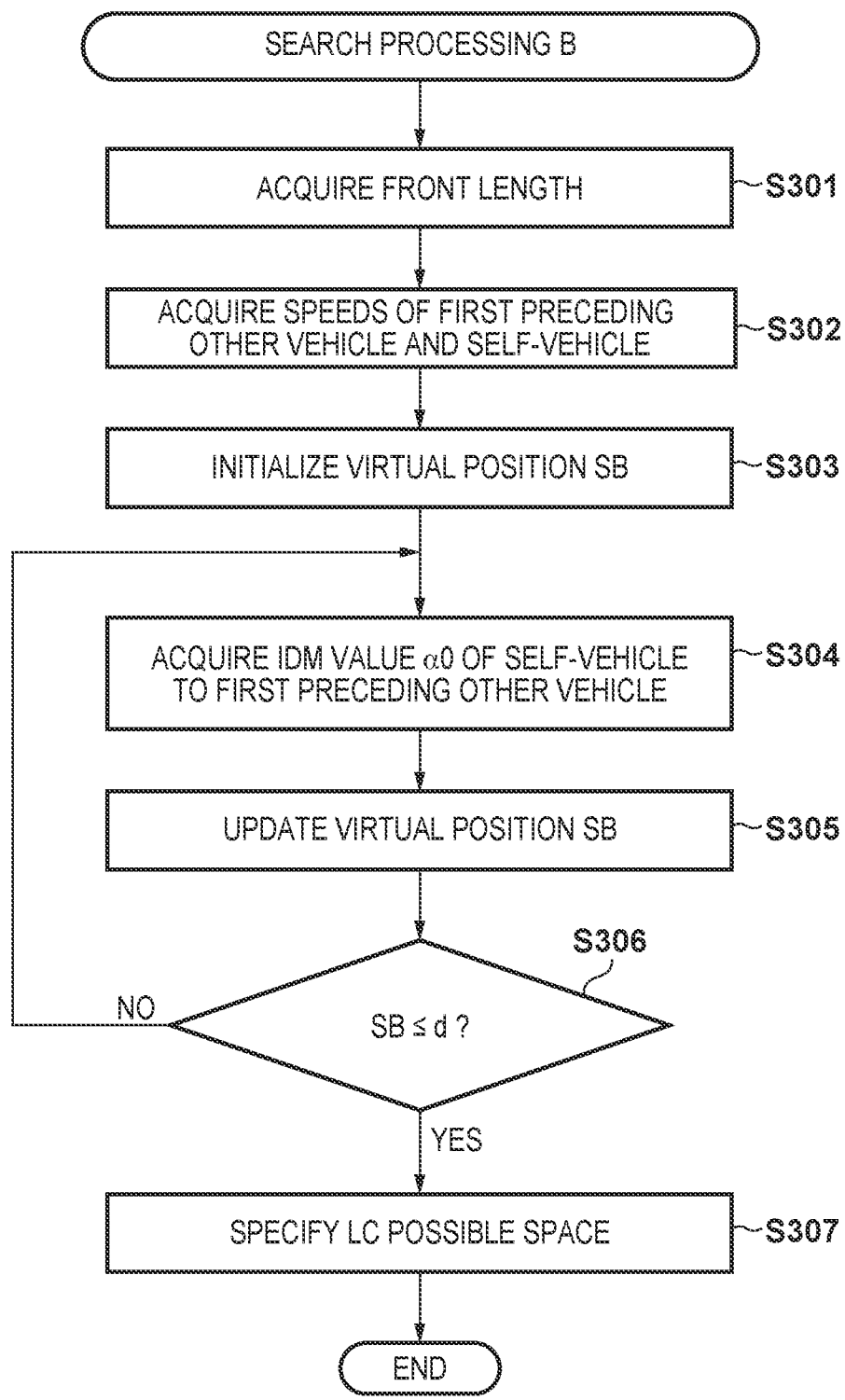
FIG. 6 is a flowchart showing search processing.

FIG. 6 is a flowchart showing the search processing B of step S103. In step S301, the control unit 200 acquires a front length. Here, the front length corresponds to the inter-vehicle distance 307 in FIG. 3.

In step S302, the control unit 200 acquires the speed Vf0 of the first preceding other vehicle and the speed Ve of the self-vehicle 301. Here, the first preceding other vehicle is the vehicle 302. Also, the speed Ve acquired here is the speed after acceleration for a lane change. The control unit 200 acquires the speed of the first preceding other vehicle using, for example, the outside recognition camera 207 and the outside recognition sensor 208.

In step S303, the control unit 200 initializes a variable SB (virtual position SB) representing a virtual position (future position) of the self-vehicle 301 at the inter-vehicle distance 307. The initial value of the virtual position SB is, for example, a position 1 m behind the vehicle 302 (SB=1).

In step S304, the control unit 200 acquires an IDM value $\alpha 0$ of the self-vehicle 301 at the virtual position SB with respect to the first preceding other vehicle. In step S304, the control unit 200 creates an IDM model based on, for example, the speed of the self-vehicle 301 at the virtual position SB, obtains the IDM value $\alpha 0$ from the relative speed and the inter-vehicle distance between the first preceding other vehicle and the self-vehicle 301 at the virtual position SB, and holds it in the storage area in association with the virtual position SB.

In step S305, the control unit 200 updates the virtual position SB. The virtual position SB may be, for example, incremented one by one. In step S306, the control unit 200 determines whether a predetermined condition is satisfied, for example, whether the updated virtual position SB satisfies "SB≤d". Here, d corresponds to the inter-vehicle distance 307 shown in FIG. 3. Upon determining that a predetermined condition is satisfied, the process advances to step S307. Upon determining that a predetermined condition is not satisfied, processing from step S304 is repeated.

In step S307, the control unit 200 specifies, as the LC possible space 306, a space in which the acceleration/deceleration α0 obtained for each virtual position SB has a magnitude equal to or less than a predetermined value (for example, 0.2 or less). That is, when the search processing B in FIG. 6 ends, a space in which the magnitude of the acceleration/deceleration has a predetermined value or less when accelerating and then making a lane change can be specified ahead the self-vehicle 301. After step S307, the processing shown in FIG. 6 is ended.

Referring back to FIG. 4, after steps S102 and S103, the process advances to step S104. In step S104, the control unit 200 judges, based on the LC possible space 308 specified in step S209 of the search processing A and the LC possible space 306 specified in step S307 of the search processing B, whether a lane change is possible. Upon judging that a lane change is possible, the LC position at which the self-vehicle 301 enters the LC possible space 308 is decided. For example, if the length of the overlap region between the LC possible space 306 and the LC possible space 308 is equal to or more than the vehicle length of the self-vehicle 301, it is judged that a lane change is possible. Upon judging that a lane change is not possible, the lane change is stopped, and the processing shown in FIG. 4 is ended. In addition, upon judging that a lane change is possible, for example, the control unit 200 decides, as the LC position, a position to enter the LC possible space 308 in a shortest distance from the position of the self-vehicle 301. For example, if the LC possible space 306 is included in the LC possible space 308, a position translated to the adjacent lane ahead of the self-vehicle 301 by the vehicle length is decided as the LC position. In step S105, the control unit 200 controls the self-vehicle 301 to do a lane change to the decided LC position. After step S105, the processing shown in FIG. 4 is ended.

Figure 8:
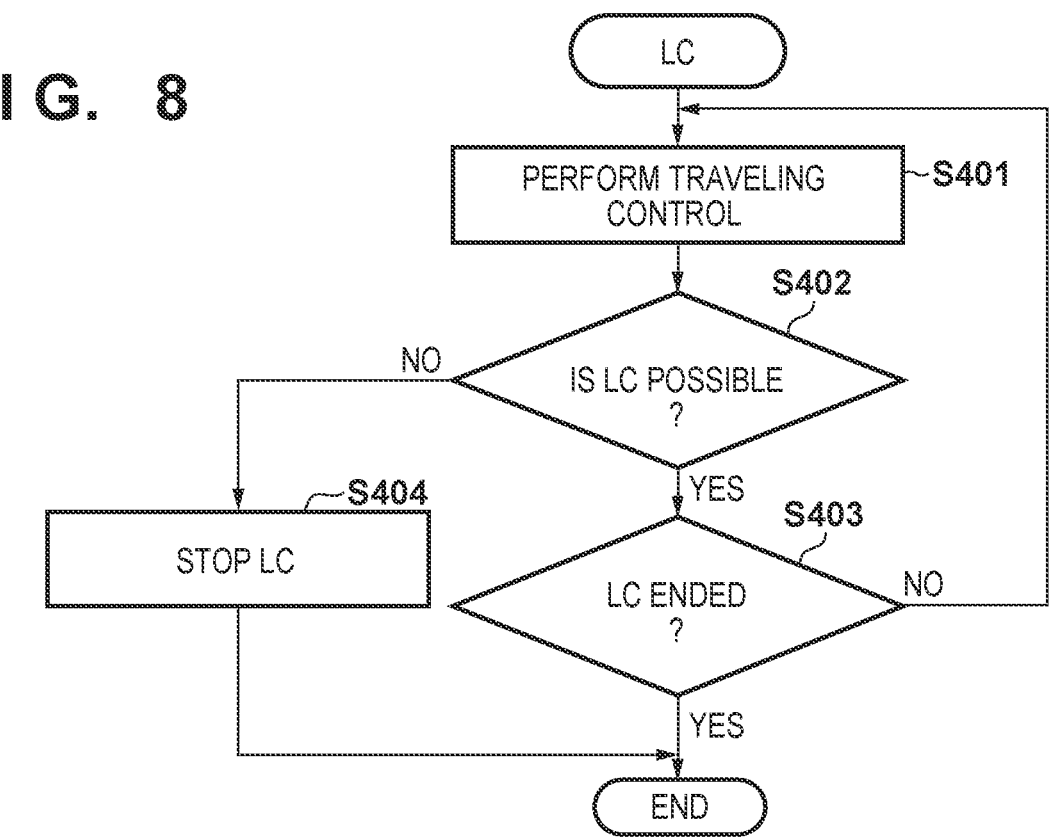
FIG. 8 is a flowchart showing processing of a lane change.

FIG. 8 is a flowchart showing the process of step S105. In step S401, the control unit 200 controls the traveling of the self-vehicle 301 to the LC position decided in step S104. At this time, traveling of the self-vehicle 301 is controlled such that the process is performed within a predetermined time from lighting of the turn signal in step S101. The predetermined time is, for example, a time of 10 sec from lighting of the turn signal to the lane change end.

In step S402, the control unit 200 determines whether a lane change is possible. The control unit 200 determines whether the magnitude of the acceleration/deceleration applied to the self-vehicle 301 by the influence of the second preceding other vehicle has become larger than a predetermined value. In addition, the control unit 200 determines whether the magnitude of the acceleration/deceleration applied to the second following other vehicle by the influence exerted on the second following other vehicle has become larger than a predetermined value. Upon determining, in one of the two above-described determinations, that the magnitude of the acceleration/deceleration has become larger than a predetermined value, the control unit 200 determines that a lane change is not possible. In step S404, the lane change is stopped, and the processes shown in FIGS. 8 and 4 are ended.

On the other hand, upon determining, in both of the two above-described determinations, that the magnitude of the acceleration/deceleration has not become larger than a predetermined value, the control unit 200 determines in step S403 whether traveling control of the lane change has ended. In step S403, the control unit 200 makes the determination based on whether the self-vehicle 301 has reached the LC position decided in step S104. Upon determining that traveling control of the lane change has ended, the processes shown in FIGS. 8 and 4 are ended. On the other hand, upon determining that traveling control of the lane change has not ended, processing from step S401 is repeated.

As described above, according to this embodiment, when accelerating and then making a lane change to the adjacent lane, the influence received from the first preceding other vehicle on the self-lane, the influence received from the second preceding other vehicle on the adjacent lane, and the influence exerted on the second following other vehicle on the adjacent lane are taken into consideration. As a result, it is possible to specify an optimum entering position to the adjacent lane and perform a smooth lane change without impeding traveling of whole traffic.

Second Embodiment

Concerning the second embodiment, points different from the first embodiment will be described next. In the first embodiment, a case in which a vehicle accelerates and then makes a lane change to an adjacent lane has been described. In the second embodiment, a case in which a vehicle decelerates and then makes a lane change to an adjacent lane will be described.

Figure 9:
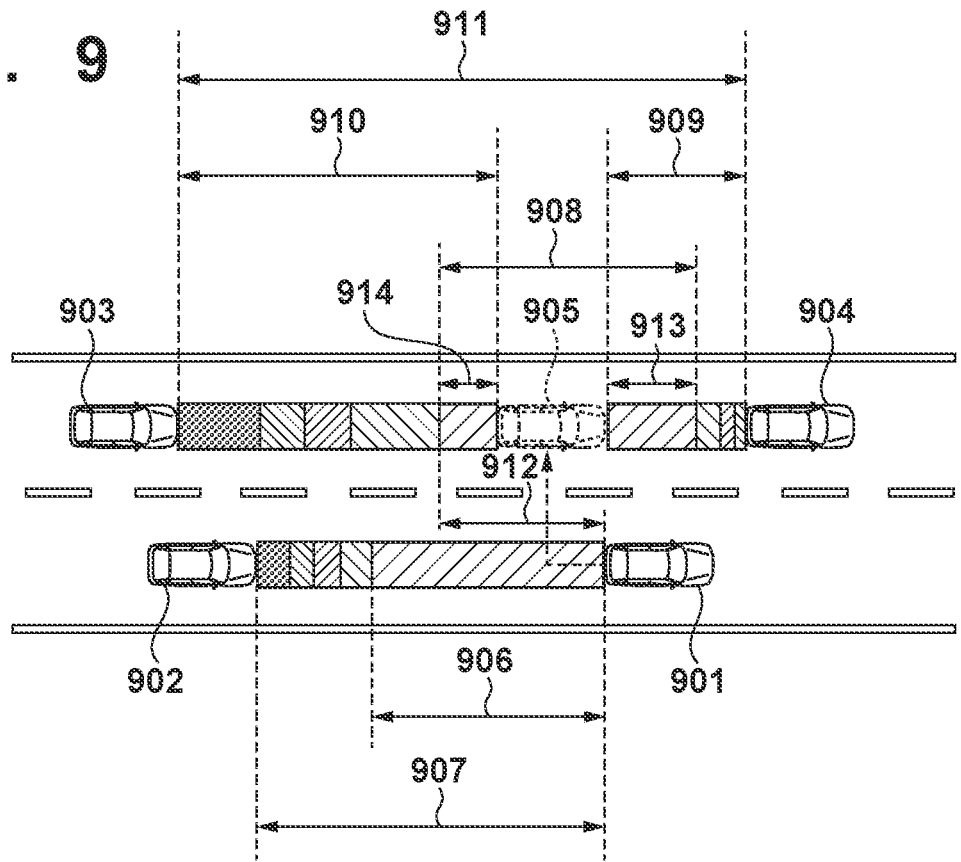
FIG. 9 is a view for explaining an entering operation between vehicles by a lane change.

FIG. 9 is a view for explaining an entering operation between vehicles by a lane change according to this embodiment. Referring to FIG. 9, a self-vehicle 901 is traveling at Ve on a self-lane. A vehicle 902 is a following other vehicle that is traveling at a speed Vr0 on the self-lane behind the self-vehicle 901. A vehicle 903 is a following other vehicle that is traveling at a speed Vr on an adjacent lane behind the self-vehicle 901. A vehicle 904 is a preceding other vehicle that is traveling at a speed Vf on the adjacent lane ahead the self-vehicle 901. This embodiment assumes a scene in which the self-vehicle 901 makes a lane change (LC) by decelerating from the self-lane to the adjacent lane in such a positional relationship of the vehicles. If a lane change is performed in such a scene, the self-vehicle 901 enters the inter-vehicle region between the vehicle 903 and the vehicle 904, which is set as a target. A position 905 represents an estimated future position of the self-vehicle 901 in the inter-vehicle region between the vehicle 903 and the vehicle 904 in such a case.

Referring to FIG. 9, the hatching indication between the self-vehicle 901 and the vehicle 902 represents the distribution of an acceleration/deceleration α received by the vehicle 902 at an inter-vehicle distance 907 in a case in which the self-vehicle 901 and the vehicle 902 are considered as an IDM model. In particular, an LC possible space 906 indicated by a thick hatching in a backward diagonal direction represents that the magnitude of the acceleration/deceleration α received by the vehicle 902 is equal to or less than a predetermined value. For this reason, since the impact that the self-vehicle 901 exerts on the vehicle 902 is relatively small, the self-vehicle 901 can smoothly perform a lane change to an LC possible space 908 to be described later as a target.

In addition, the hatching indication between the position 905 and the vehicle 904 represents the distribution of the acceleration/deceleration α received by the self-vehicle 901 at the future position at an inter-vehicle distance 909 in a case in which the self-vehicle 901 at the future position at, for example, the position 905 and the vehicle 904 are considered as an IDM model. In particular, a space 913 indicated by a thick hatching in a backward diagonal direction represents that the magnitude of the acceleration/deceleration α received by the self-vehicle 901 at the future position is equal to or less than a predetermined value. For this reason, since the impact that the self-vehicle 901 at the future position receives from the vehicle 904 is relatively small, the self-vehicle 901 can smoothly perform a lane change to the LC possible space 908 as a target.

In addition, the hatching indication between the vehicle 903 and the position 905 represents the distribution of the acceleration/deceleration α received by the vehicle 903 at an inter-vehicle distance 910 in a case in which the vehicle 903 and the self-vehicle 901 at the future position at, for example, the position 905 are considered as an IDM model. In particular, a space 914 indicated by a thick hatching in a backward diagonal direction represents that the magnitude of the acceleration/deceleration α received by the vehicle 903 is equal to or less than a predetermined value. For this reason, since the impact that the vehicle 903 receives from the self-vehicle 901 at the future position is relatively small, the self-vehicle 901 can smoothly perform a lane change to the LC possible space 908 as a target.

In this embodiment, the space where the LC possible space 906 and the LC possible space 908 overlap, that is, in FIG. 9, the position closest from the self-vehicle 901 in a space 912 is specified as the LC position where the self-vehicle 901 makes a lane change. If a lane change is performed at the specified position, all of the influence that the self-vehicle 901 exerts on the vehicle 902, the influence that the self-vehicle 901 at the future position receives from the vehicle 904, and the influence that the self-vehicle 901 at the future position exerts on the vehicle 903 can be reduced, and a smooth lane change can be implemented.

In this embodiment as well, the processes shown in FIGS. 4 and 5 are similarly performed. In this embodiment, however, in search processing B of step S103 in FIG. 5, the LC possible space 906 in the region with respect to the vehicle 902 is searched for.

Figure 10:
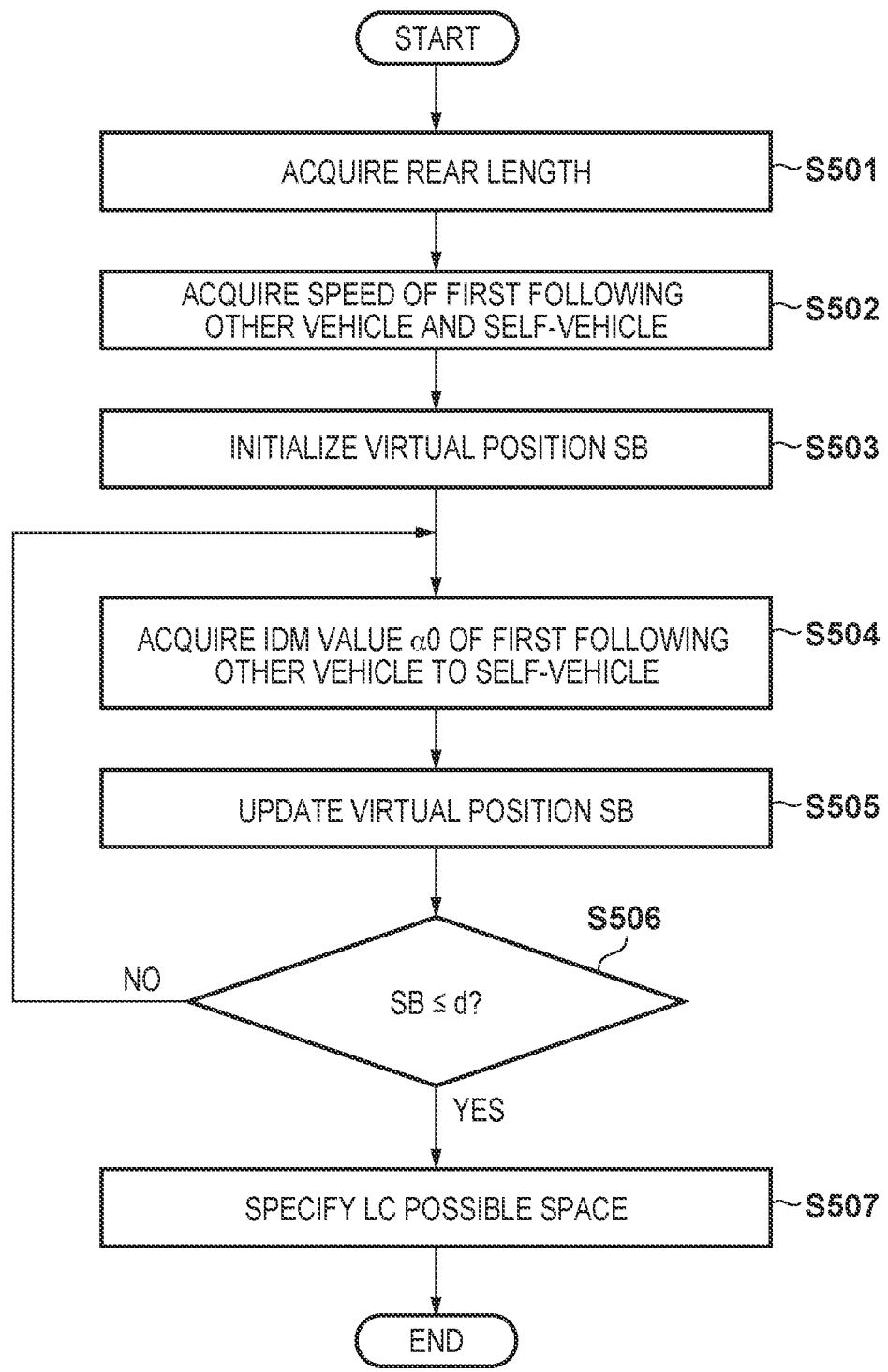
FIG. 10 is a flowchart showing search processing.

FIG. 10 is a flowchart showing the search processing B of step S103 according to this embodiment. In step S501, a control unit 200 acquires a rear length. Here, the rear length corresponds to the inter-vehicle distance 907 in FIG. 9.

In step S502, the control unit 200 acquires the speed Vr0 of the first following other vehicle and the speed Ve of the self-vehicle 901. Here, the first following other vehicle is the vehicle 902. Also, the speed Ve acquired here is the speed after deceleration for a lane change. The control unit 200 acquires the speed of the first following other vehicle using, for example, an outside recognition camera 207 and an outside recognition sensor 208.

In step S503, the control unit 200 initializes a variable SB (virtual position SB) representing a virtual position (future position) of the self-vehicle 901 at the inter-vehicle distance 907. The initial value of the virtual position SB is, for example, a position 1 m behind the first following other vehicle (SB=1).

In step S504, the control unit 200 acquires an IDM value α0 of the first following other vehicle with respect to the self-vehicle 901 at the virtual position SB. In step S504, the control unit 200 creates an IDM model based on, for example, the speed of the first following other vehicle, obtains the IDM value α0 from the relative speed and the inter-vehicle distance between the first following other vehicle and the self-vehicle 901 at the virtual position SB, and holds it in the storage area in association with the virtual position SB.

In step S505, the control unit 200 updates the virtual position SB. The virtual position SB may be, for example, incremented one by one. In step S506, the control unit 200 determines whether a predetermined condition is satisfied, for example, whether the updated virtual position SB satisfies "SB≤d". Here, d corresponds to the inter-vehicle distance 907 shown in FIG. 9. Upon determining that a predetermined condition is satisfied, the process advances to step S507. Upon determining that a predetermined condition is not satisfied, processing from step S504 is repeated.

In step S507, the control unit 200 specifies, as the LC possible space 906, a space in which the acceleration/deceleration α0 obtained for each virtual position SB has a magnitude equal to or less than a predetermined value (for example, 0.2 or less). That is, when the search processing B in FIG. 10 ends, a space in which the magnitude of the acceleration/deceleration has a predetermined value or less when decelerating and then making a lane change can be specified behind the self-vehicle 901. After step S507, the processing shown in FIG. 10 is ended.

After steps S102 and S103 in FIG. 4, the process advances to step S104. In step S104, the control unit 200 decides, based on the LC possible space 908 specified in step S209 of the search processing A and the LC possible space 906 specified in step S507 of the search processing B, the LC position at which the self-vehicle 901 enters the LC possible space 908. For example, the control unit 200 decides, as the LC position, a position to enter the LC possible space 908 in a shortest distance from the position of the self-vehicle 901. For example, if the LC possible space 906 is included in the LC possible space 908, a position translated to the adjacent lane ahead of the self-vehicle 901 by the vehicle length is decided as the LC position. In step S105, the control unit 200 controls the self-vehicle 901 to do a lane change to the decided LC position. After step S105, the processing shown in FIG. 4 is ended. The processing shown in FIG. 8, which is performed in step S105, is the same as described in the first embodiment.

As described above, according to this embodiment, when decelerating and then making a lane change to the adjacent lane, the influence exerted on the first following other vehicle on the self-lane, the influence received from the second preceding other vehicle on the adjacent lane, and the influence exerted on the second following other vehicle on the adjacent lane are taken into consideration. As a result, it is possible to specify an optimum entering position to the adjacent lane and perform a smooth lane change without impeding traveling of whole traffic.

Third Embodiment

Concerning the third embodiment, points different from the first and second embodiments will be described next. In the first embodiment, a case in which a vehicle accelerates and then makes a lane change to an adjacent lane has been described. In the second embodiment, a case in which a vehicle decelerates and then makes a lane change to an adjacent lane has been described. In the third embodiment, a case in which it is judged whether to accelerate and then make a lane change to an adjacent lane or decelerate and then make a lane change to an adjacent lane will be described.

Figure 11:
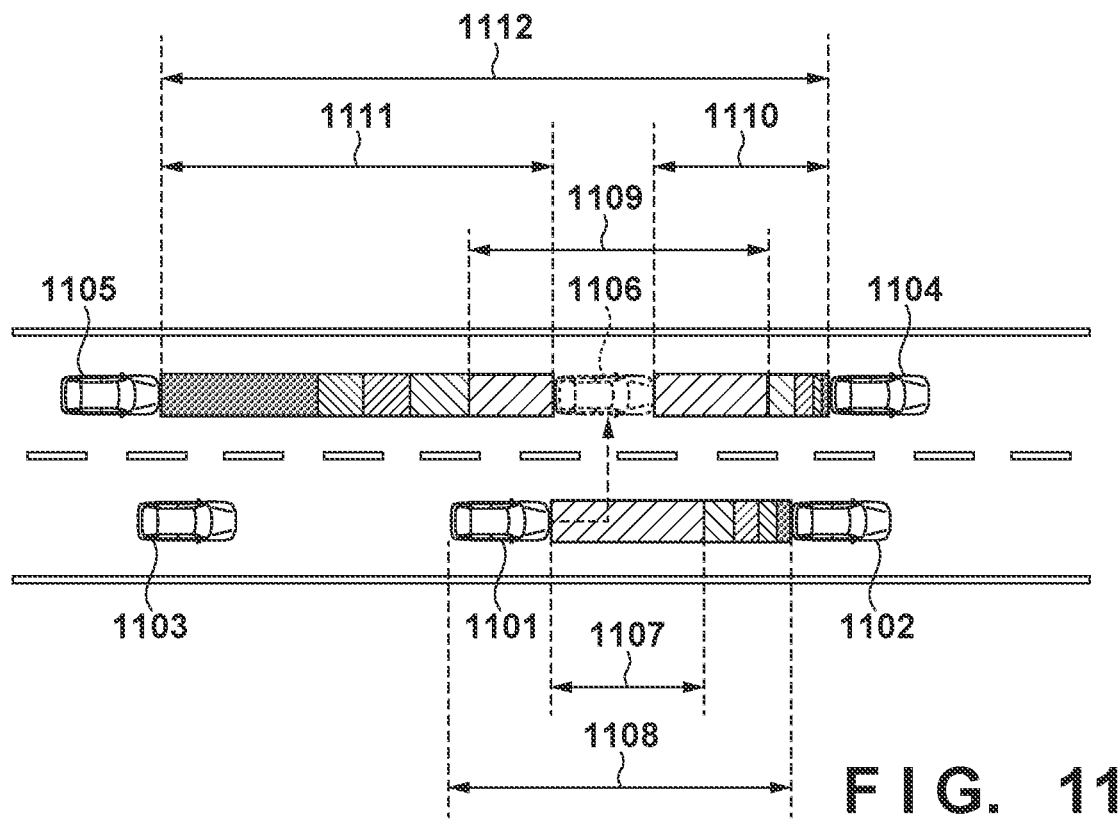
FIG. 11 is a view for explaining an entering operation between vehicles by a lane change.
Figure 12:
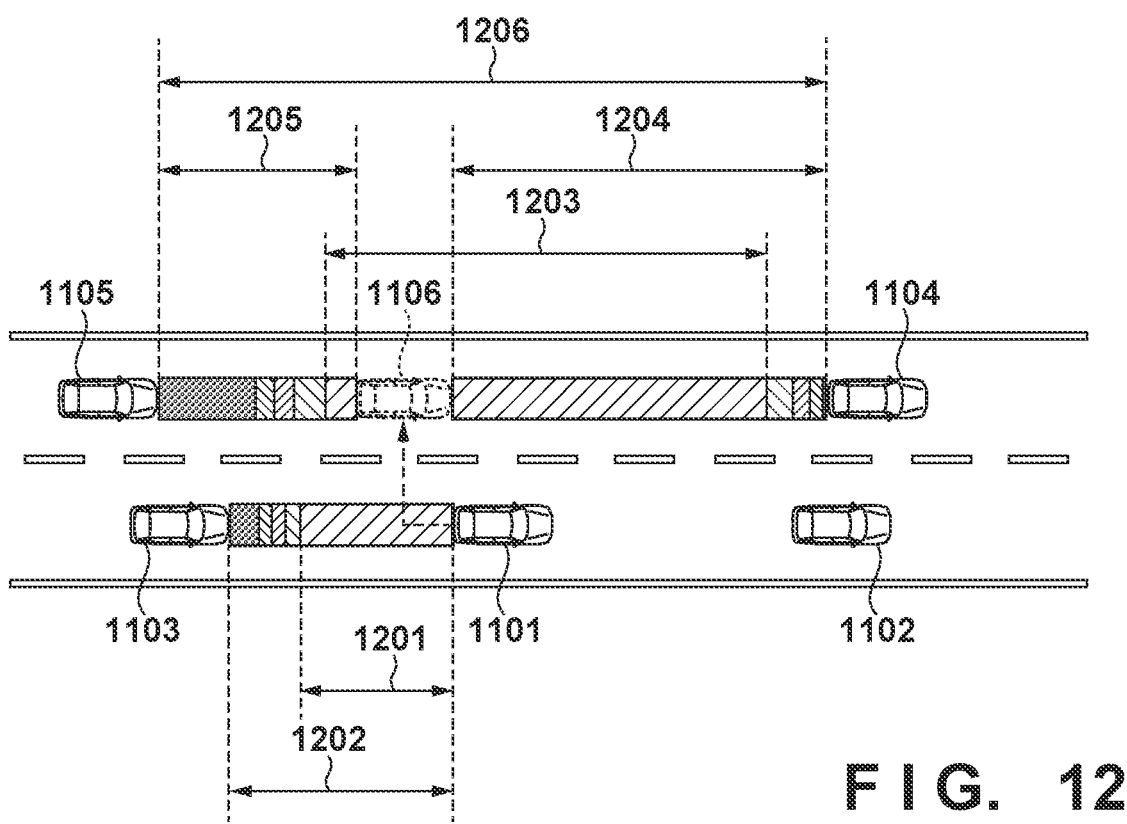
FIG. 12 is a view for explaining an entering operation between vehicles by a lane change.

FIGS. 11 and 12 are views for explaining an entering operation between vehicles by a lane change according to this embodiment. Referring to FIGS. 11 and 12, a self-vehicle 1101 is traveling at Ve on a self-lane. A vehicle 1102 is a first preceding other vehicle that is traveling at a speed Vf0 on the self-lane ahead the self-vehicle 1101. A vehicle 1103 is a first following other vehicle that is traveling at a speed Vr0 on the self-lane behind the self-vehicle 1101. A vehicle 1105 is a second following other vehicle that is traveling at a speed Vr on the adjacent lane behind the self-vehicle 1101. A vehicle 1104 is a second preceding other vehicle that is traveling at a speed Vf on the adjacent lane ahead the self-vehicle 1101. In this embodiment, in such a positional relationship of the vehicles, it is judged whether the self-vehicle 1101 accelerates and then makes a lane change to the adjacent lane or decelerates and then makes a lane change to the adjacent lane.

Figure 13:
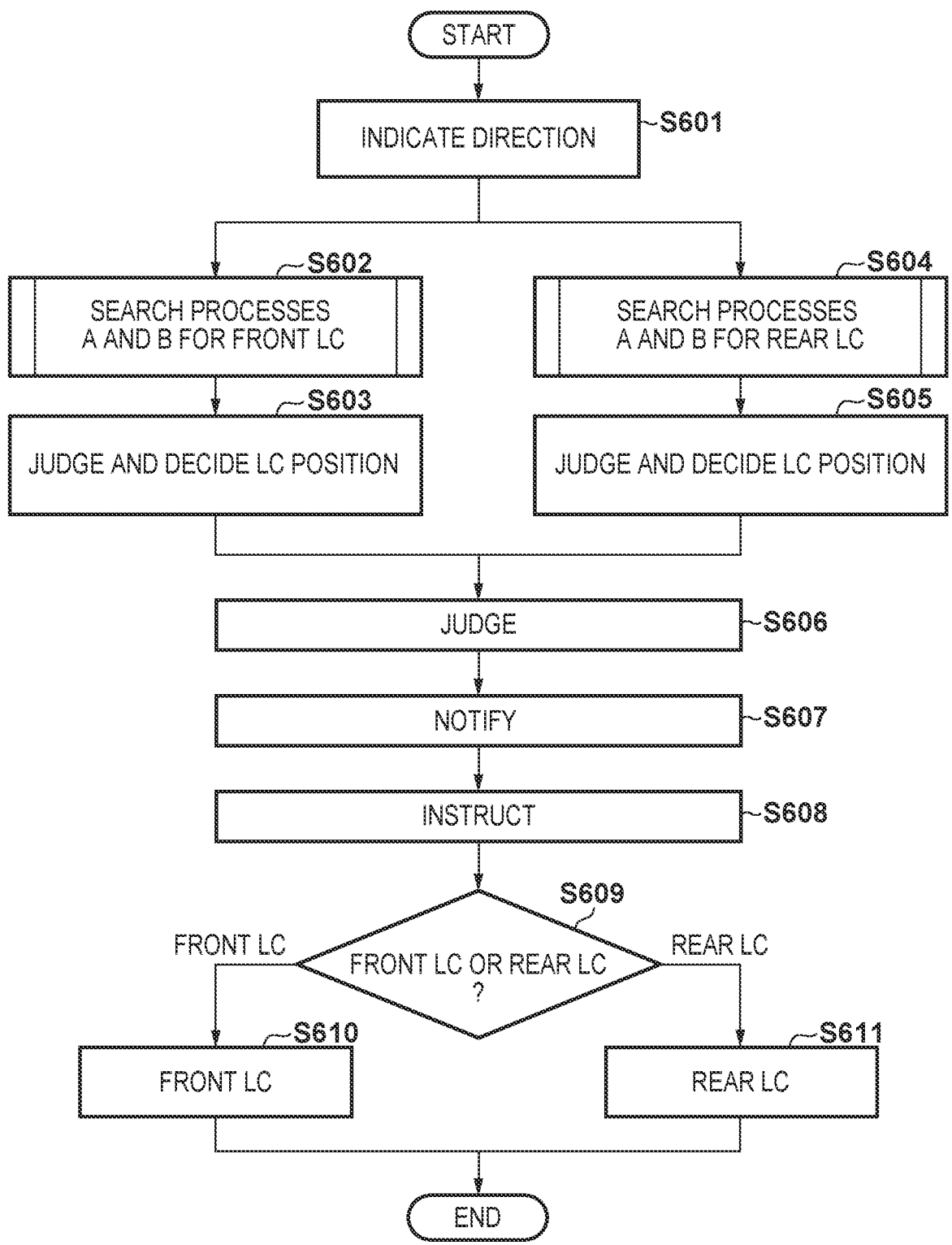
FIG. 13 is a flowchart showing processing of a lane change.

FIG. 13 is a flowchart showing processing of a lane change of the self-vehicle 1101 according to this embodiment. Processing shown in FIG. 13 is implemented when, for example, a control unit 200 of the self-vehicle 1101 reads out a program stored in a storage area such as a ROM and executes it. A description will be made below by referring to the control unit 200 of the self-vehicle 1101 simply as the control unit 200 unless specified otherwise. A lane change after acceleration will also be referred to as a front lane change (front LC), and a lane change after deceleration will also be referred to as a rear lane change (rear LC).

In step S601, the control unit 200 accepts a lane change request and, for example, lights a turn signal. After that, the processes of steps S602 and S603 and the processes of steps S604 and S605 are performed. In step S602, the control unit 200 performs search processes A and B for a front LC. The process of step S602 is the same as in steps S102 and S103 of FIG. 4 described in the first embodiment. In step S603, the control unit 200 decides an LC position for the front LC. The process of step S603 is the same as in step S104 FIG. 4. That is, based on an LC possible space 1109 specified in step S209 of the search processing A and an LC possible space 1107 specified in step S307 of the search processing B, the LC position at which the self-vehicle 1101 enters the LC possible space 1109 is decided.

On the other hand, in step S604, the control unit 200 performs the search processes A and B for a rear LC. The process of step S604 is the same as in steps S102 and S103 of FIG. 4 described in the second embodiment. In step S605, the control unit 200 decides an LC position for the rear LC. The process of step S605 is the same as in step S209 of FIG. 5 and step S507 of FIG. 10 described in the second embodiment. That is, based on an LC possible space 1203 specified in step S209 of the search processing A and an LC possible space 1201 specified in step S507 of the search processing B, the LC position at which the self-vehicle 1101 enters the LC possible space 1203 is decided.

The processes of steps S602 and S603 and the processes of steps S604 and S605 are performed in parallel, as described above. However, the processes of steps S602 and S603 and the processes of steps S604 and S605 may be performed sequentially.

In step S606, the control unit 200 judges whether to perform a front LC or a rear LC. This judgment is done, for example, in the following way. The overlap region between the LC possible space 1107 and the LC possible space 1109 specified in step S602 is obtained. On the other hand, the overlap region between the LC possible space 1201 and the LC possible space 1203 specified in step S604 is obtained. As the overlap region, for example, the length of overlap in the lane direction is obtained. The control unit 200 judges to execute a lane change operation performed for the larger overlap region. Note that if the overlap region has a predetermined length or less, the lane change may be stopped. The predetermined length in this case is, for example, the vehicle length of the self-vehicle 1101.

In step S607, the control unit 200 notifies that the lane change operation judged in step S605 to be executed should be executed. This notification is made by, for example, displaying a user interface screen on a display device 216 via a device control unit 206. In step S608, the control unit 200 accepts, on the user interface screen, an instruction of the lane change operation from the driver.

In step S609, the control unit 200 determines which one of the front LC and the rear LC is to be executed as the lane change operation to be executed based on the accepted instruction. Upon determining that the lane change operation is the front LC, in step S610, the control unit 200 controls the self-vehicle 1101 to do a lane change to the LC position decided in step S603, as in step S105 of the first embodiment. After that, the processing shown in FIG. 13 is ended. On the other hand, upon determining that the lane change operation is the rear LC, in step S611, the control unit 200 controls the self-vehicle 1101 to do a lane change to the LC position decided in step S605, as in step S105 of the second embodiment. After that, the processing shown in FIG. 13 is ended.

As described above, according to this embodiment, it is judged whether to accelerate and then make a lane change to an adjacent lane or decelerate and then make a lane change to an adjacent lane. As a result, it is possible to more easily specify an optimum entering position to the adjacent lane and perform a lane change without impeding smooth traveling of each vehicle as a whole.

Summary of Embodiments

A traveling control apparatus according to this embodiment comprises an acquisition unit configured to acquire information outside a vehicle (outside recognition camera 207, outside recognition sensor 208), a control unit configured to control traveling of the vehicle based on the information outside the vehicle, which is acquired by the acquisition unit (control unit 200), a first specifying unit configured to, if the acquisition unit acquires, as the information outside the vehicle, information of a first preceding other vehicle that is a vehicle traveling on a traveling lane of the vehicle and is traveling ahead the vehicle, specify a first possible space (906), for which a lane change of the vehicle is possible, from an inter-vehicle distance between the first preceding other vehicle and the vehicle, a speed of the first preceding other vehicle, and a speed of the vehicle (S103), a second specifying unit configured to, if the acquisition unit acquires, as the information outside the vehicle, information of a following other vehicle that is a vehicle traveling on an adjacent lane different from the traveling lane of the vehicle and is traveling behind the vehicle and information of a second preceding other vehicle traveling ahead the vehicle and the following other vehicle, specify a second possible space, for which the lane change of the vehicle is possible, from an inter-vehicle distance between the second preceding other vehicle and the following other vehicle, a speed of the second preceding other vehicle, and a speed of the following other vehicle (S102), and a judgment unit configured to judge, based on the first possible space specified by the first specifying unit and the second possible space (908) specified by the second specifying unit, whether the lane change of the vehicle is possible.

With this arrangement, it is possible to judge a lane change to the front side based on the other vehicle on the self-lane and the other vehicle on the adjacent lane.

In addition, the second specifying unit specifies the second possible space based on a position (905) of the vehicle estimated on the adjacent lane, and the estimated position of the vehicle is a position at which the vehicle is estimated to have made the lane change in a predetermined time in which the lane change is necessary. The second specifying unit specifies the second possible space based on a third possible space specified from an estimated inter-vehicle distance (910) between the vehicle and the following other vehicle, the speed of the following other vehicle, and the estimated or measured speed of the vehicle, and a fourth possible space specified from an estimated inter-vehicle distance (909) between the vehicle and the second preceding other vehicle, the estimated or measured speed of the vehicle, and the speed of the second preceding other vehicle. The second possible space is a region including the third possible space and the fourth possible space.

With this arrangement, it is possible to judge a lane change based on the behavior of the other vehicle on the self-lane and the behavior of the other vehicle on the adjacent lane. It is also possible to specify, as a space for which a lane change is possible, a space obtained from the behaviors of the other vehicles on the front and rear sides of the estimated position of the vehicle.

Also, each of the first possible space, the second possible space, the third possible space, and the fourth possible space is specified based on a model (FIG. 7) configured to calculate an acceleration/deceleration using an inter-vehicle distance and a relative distance between two vehicles. Each of the first possible space, the second possible space, the third possible space, and the fourth possible space is specified as a space in which a magnitude of the acceleration/deceleration is not more than a predetermined value.

With this arrangement, it is possible to judge a lane change based on the behavior of the other vehicle on the self-lane and the behavior of the other vehicle on the adjacent lane using an IDM model.

Furthermore, if the first possible space and the second possible space are adjacent along an axis in a lane direction, the judgment unit judges that the lane change of the vehicle is possible (S104).

With this arrangement, if the first possible space and the second possible space overlap in the lane direction, it can be judged that the lane change is possible.

Additionally, if the judgment unit judges that the lane change of the vehicle is possible, the control unit controls the traveling of the vehicle to start the lane change (S105). If the first possible space and the second possible space are adjacent along the axis in the lane direction, the control unit controls the traveling of the vehicle to perform the lane change at a position closest from the vehicle in the adjacent space.

With this arrangement, based on the first possible space and the second possible space, it is possible to make a lane change in a shortest distance.

In addition, specifying of the first possible space by the first specifying unit and specifying of the second possible space by the second specifying unit are performed in parallel (S102, S103).

With this arrangement, it is possible to prevent the processing time until the lane change is made from becoming long.

Also, specifying of the first possible space by the first specifying unit and specifying of the second possible space by the second specifying unit are started in accordance with input of a direction indication by an occupant (S101).

With this arrangement, it is possible to start the processing using, for example, lighting of a turn signal as a trigger.

A traveling control apparatus according to this embodiment comprises an acquisition unit configured to acquire information outside a vehicle, a control unit configured to control traveling of the vehicle based on the information outside the vehicle, which is acquired by the acquisition unit, a first specifying unit configured to, if the acquisition unit acquires, as the information outside the vehicle, information of a first following other vehicle that is a vehicle traveling on a traveling lane of the vehicle and is traveling behind the vehicle, specify a first possible space, for which a lane change of the vehicle is possible, from an inter-vehicle distance (907) between the first following other vehicle and the vehicle, a speed of the first following other vehicle, and a speed of the vehicle, a second specifying unit configured to, if the acquisition unit acquires, as the information outside the vehicle, information of a second following other vehicle that is a vehicle traveling on an adjacent lane different from the traveling lane of the vehicle and is traveling behind the vehicle and information of a preceding other vehicle traveling ahead the vehicle and the second following other vehicle, specify a second possible space, for which the lane change of the vehicle is possible, from an inter-vehicle distance between the preceding other vehicle and the second following other vehicle, a speed of the preceding other vehicle, and a speed of the second following other vehicle, and a judgment unit configured to judge, based on the first possible space specified by the first specifying unit and the second possible space specified by the second specifying unit, whether the lane change of the vehicle is possible.

With this arrangement, it is possible to judge a lane change to the rear side based on the other vehicle on the self-lane and the other vehicle on the adjacent lane.

A traveling control apparatus according to this embodiment comprises an acquisition unit configured to acquire information outside a vehicle, a control unit configured to control traveling of the vehicle based on the information outside the vehicle, which is acquired by the acquisition unit, a first specifying unit configured to, if the acquisition unit acquires, as the information outside the vehicle, information of another vehicle traveling on a traveling lane of the vehicle, specify a first possible space, for which a lane change of the vehicle is possible, from an inter-vehicle distance between the other vehicle and the vehicle, a speed of the other vehicle, and a speed of the vehicle (FIG. 11, FIG. 12), a second specifying unit configured to, if the acquisition unit acquires, as the information outside the vehicle, information of a following other vehicle that is a vehicle traveling on an adjacent lane different from the traveling lane of the vehicle and is traveling behind the vehicle and information of a preceding other vehicle traveling ahead the vehicle and the following other vehicle, specify a second possible space, for which the lane change of the vehicle is possible, from an inter-vehicle distance between the preceding other vehicle and the following other vehicle, a speed of the preceding other vehicle, and a speed of the following other vehicle, and a judgment unit configured to judge, based on the first possible space specified by the first specifying unit and the second possible space specified by the second specifying unit, whether the lane change of the vehicle is possible.

With this arrangement, it is possible to judge a lane change based on the other vehicle on the self-lane and the other vehicle on the adjacent lane.

The invention is not limited to the foregoing embodiments, and various variations/changes are possible within the spirit of the invention.

What is claimed is:

1. A traveling control apparatus comprising:
an acquisition unit configured to acquire information outside a vehicle;
a control unit configured to control traveling of the vehicle based on the information outside the vehicle, which is acquired by the acquisition unit;
a first specifying unit configured to, if the acquisition unit acquires, as the information outside the vehicle, information of a first preceding other vehicle that is a vehicle traveling on a traveling lane of the vehicle and is traveling ahead the vehicle, specify a first possible space, for which a lane change of the vehicle is possible, based on an inter-vehicle distance between the first preceding other vehicle and the vehicle, a speed of the first preceding other vehicle, and a speed of the vehicle;
a second specifying unit configured to, if the acquisition unit acquires, as the information outside the vehicle, information of a following other vehicle that is a vehicle traveling on an adjacent lane different from the traveling lane of the vehicle and is traveling behind the vehicle and information of a second preceding other vehicle traveling ahead the vehicle and the following other vehicle, specify a second possible space, for which the lane change of the vehicle is possible, based on an inter-vehicle distance between the second preceding other vehicle and the following other vehicle, a speed of the second preceding other vehicle, a speed of the following other vehicle, and a speed of the vehicle at a virtual position obtained by estimating that the vehicle has made a lane change to between the following other vehicle and the second preceding other vehicle in the adjacent lane; and
a judgment unit configured to judge, based on the first possible space specified by the first specifying unit and the second possible space specified by the second specifying unit, whether the lane change of the vehicle is possible,
wherein the first possible space is a space in which an acceleration/deceleration of the vehicle obtained from the inter-vehicle distance and a relative speed between the first preceding other vehicle and the vehicle has a magnitude equal to or less than a predetermined value,
the second possible space is a space in which an acceleration/deceleration of the vehicle at the virtual position obtained from an inter-vehicle distance and a relative speed between the second preceding other vehicle and the vehicle at the virtual position has a magnitude equal to or less than a predetermined value, and in which an acceleration/deceleration of the following other vehicle obtained from an inter-vehicle distance and a relative speed between the following other vehicle and the vehicle at the virtual position has a magnitude equal to or less than a predetermined value.

2. The apparatus according to claim 1, wherein the second specifying unit specifies the second possible space based on a third possible space specified from an estimated inter-vehicle distance between the vehicle and the following other vehicle, the speed of the following other vehicle, and the estimated or measured speed of the vehicle, and a fourth possible space specified from an estimated inter-vehicle distance between the vehicle and the second preceding other vehicle, the estimated or measured speed of the vehicle, and the speed of the second preceding other vehicle.

3. The apparatus according to claim 2, wherein the second possible space is a region including the third possible space and the fourth possible space.

4. The apparatus according to claim 2, wherein each of the first possible space, the second possible space, the third possible space, and the fourth possible space is specified based on a model configured to calculate an acceleration/deceleration using an inter-vehicle distance and a relative speed between two vehicles.

5. The apparatus according to claim 1, wherein if the first possible space and the second possible space are adjacent along an axis in a lane direction, the judgment unit judges that the lane change of the vehicle is possible.

6. The apparatus according to claim 5, wherein if the first possible space and the second possible space are adjacent along the axis in the lane direction, the control unit controls the traveling of the vehicle to perform the lane change at a position closest from the vehicle in the adjacent space.

7. The apparatus according to claim 1, wherein if the judgment unit judges that the lane change of the vehicle is possible, the control unit controls the traveling of the vehicle to start the lane change.

8. The apparatus according to claim 1, wherein specifying of the first possible space by the first specifying unit and specifying of the second possible space by the second specifying unit are performed in parallel.

9. The apparatus according to claim 1, wherein specifying of the first possible space by the first specifying unit and specifying of the second possible space by the second specifying unit are started in accordance with input of a direction indication by an occupant.

10. A traveling control apparatus comprising:
an acquisition unit configured to acquire information outside a vehicle;
a control unit configured to control traveling of the vehicle based on the information outside the vehicle, which is acquired by the acquisition unit;
a first specifying unit configured to, if the acquisition unit acquires, as the information outside the vehicle, information of a first following other vehicle that is a vehicle traveling on a traveling lane of the vehicle and is traveling behind the vehicle, specify a first possible space, for which a lane change of the vehicle is possible, based on an inter-vehicle distance between the first following other vehicle and the vehicle, a speed of the first following other vehicle, and a speed of the vehicle;
a second specifying unit configured to, if the acquisition unit acquires, as the information outside the vehicle, information of a second following other vehicle that is a vehicle traveling on an adjacent lane different from the traveling lane of the vehicle and is traveling behind the vehicle and information of a preceding other vehicle traveling ahead the vehicle and the second following other vehicle, specify a second possible space, for which the lane change of the vehicle is possible, based on an inter-vehicle distance between the preceding other vehicle and the second following other vehicle, a speed of the preceding other vehicle, a speed of the second following other vehicle, and a speed of the vehicle at a virtual position obtained by estimating that the vehicle has made a lane change to between the second following other vehicle and the preceding other vehicle in the adjacent lane; and a judgment unit configured to judge, based on the first possible space specified by the first specifying unit and the second possible space specified by the second specifying unit, whether the lane change of the vehicle is possible, wherein the first possible space is a space in which an acceleration/deceleration of the vehicle obtained from the inter-vehicle distance and a relative speed between the first following other vehicle and the vehicle has a magnitude equal to or less than a predetermined value, the second possible space is a space in which an acceleration/deceleration of the second following other vehicle obtained from an inter-vehicle distance and a relative speed between the second following other vehicle and the vehicle at the virtual position has a magnitude equal to or less than a predetermined value, and in which an acceleration/deceleration of the vehicle at the virtual position obtained from an inter-vehicle distance and a relative speed between the preceding other vehicle and the vehicle at the virtual position has a magnitude equal to or less than a predetermined value.

11. The apparatus according to claim 10, wherein the second specifying unit specifies the second possible space based on a third possible space specified from an estimated inter-vehicle distance between the vehicle and the following other vehicle, the speed of the second following other vehicle, and the estimated or measured speed of the vehicle, and a fourth possible space specified from an estimated inter-vehicle distance between the vehicle and the preceding other vehicle, the estimated or measured speed of the vehicle, and the speed of the preceding other vehicle.

12. The apparatus according to claim 11, wherein the second possible space is a region including the third possible space and the fourth possible space.

13. The apparatus according to claim 11, wherein each of the first possible space, the second possible space, the third possible space, and the fourth possible space is specified based on a model configured to calculate an acceleration/deceleration using an inter-vehicle distance and a relative speed between two vehicles.

14. The apparatus according to claim 10, wherein if the first possible space and the second possible space are adjacent along an axis in a lane direction, the judgment unit judges that the lane change of the vehicle is possible.

15. The apparatus according to claim 14, wherein if the first possible space and the second possible space are adjacent along the axis in the lane direction, the control unit controls the traveling of the vehicle to perform the lane change at a position closest from the vehicle in the adjacent space.

16. The apparatus according to claim 10, wherein if the judgment unit judges that the lane change of the vehicle is possible, the control unit controls the traveling of the vehicle to start the lane change.

17. The apparatus according to claim 10, wherein specifying of the first possible space by the first specifying unit and specifying of the second possible space by the second specifying unit are performed in parallel.

18. The apparatus according to claim 10, wherein specifying of the first possible space by the first specifying unit and specifying of the second possible space by the second specifying unit are started in accordance with input of a direction indication by an occupant.

19. A traveling control apparatus comprising:

an acquisition unit configured to acquire information outside a vehicle;

a control unit configured to control traveling of the vehicle based on the information outside the vehicle, which is acquired by the acquisition unit;

a first specifying unit configured to, if the acquisition unit acquires, as the information outside the vehicle, information of another vehicle traveling on a traveling lane of the vehicle, specify a first possible space, for which a lane change of the vehicle is possible, based on an inter-vehicle distance between the other vehicle and the vehicle, a speed of the other vehicle, and a speed of the vehicle;

a second specifying unit configured to, if the acquisition unit acquires, as the information outside the vehicle, information of a following other vehicle that is a vehicle traveling on an adjacent lane different from the traveling lane of the vehicle and is traveling behind the vehicle and information of a preceding other vehicle traveling ahead the vehicle and the following other vehicle, specify a second possible space, for which the lane change of the vehicle is possible, based on an inter-vehicle distance between the preceding other vehicle and the following other vehicle, a speed of the preceding other vehicle, and a speed of the following other vehicle, and a speed of the vehicle at a virtual position obtained by estimating that the vehicle has made a lane change to between the following other vehicle and the preceding other vehicle in the adjacent lane; and, a judgment unit configured to judge, based on the first possible space specified by the first specifying unit and the second possible space specified by the second specifying unit, whether the lane change of the vehicle is possible wherein the first possible space is a space in which an acceleration/deceleration of the vehicle obtained from the inter-vehicle distance and a relative speed between the other vehicle and the vehicle has a magnitude equal to or less than a predetermined value, the second possible space is a space in which an acceleration/deceleration of the vehicle at the virtual position obtained from an inter-vehicle distance and a relative speed between the preceding other vehicle and the vehicle at the virtual position has a magnitude equal to or less than a predetermined value, and in which an acceleration/deceleration of the following other vehicle obtained from an inter-vehicle distance and a relative speed between the following other vehicle and the vehicle at the virtual position has a magnitude equal to or less than a predetermined value.

20. The apparatus according to claim 19, wherein if the acquisition unit acquires, as the information outside the vehicle, information of a first other vehicle that is a vehicle traveling on the traveling lane of the vehicle and is traveling ahead the vehicle and a second other vehicle that is a vehicle traveling on the traveling lane of the vehicle and is traveling behind the vehicle, the first specifying unit species the first possible space based on the vehicle and the first other vehicle and the first possible space based on the second other vehicle and the vehicle, and the judgment unit judges, based on the first possible spaces specified by the first specifying unit and the second possible space specified by the second specifying unit, whether the lane change of the vehicle is possible.

21. The apparatus according to claim 20, wherein the control unit controls the traveling of the vehicle to perform one of acceleration and deceleration in accordance with a result of the judgment by the judgment unit.

22. A traveling control method executed by a traveling control apparatus, comprising:

acquiring information outside a vehicle;

controlling traveling of the vehicle based on the acquired information outside the vehicle;

if information of a first preceding other vehicle that is a vehicle traveling on a traveling lane of the vehicle and is traveling ahead the vehicle is acquired as the information outside the vehicle, specifying a first possible space, for which a lane change of the vehicle is possible, based on an inter-vehicle distance between the first preceding other vehicle and the vehicle, a speed of the first preceding other vehicle, and a speed of the vehicle;

if information of a following other vehicle that is a vehicle traveling on an adjacent lane different from the traveling lane of the vehicle and is traveling behind the vehicle and information of a second preceding other vehicle traveling ahead the vehicle and the following other vehicle are acquired as the information outside the vehicle, specifying a second possible space, for which the lane change of the vehicle is possible, based on an inter-vehicle distance between the second preceding other vehicle and the following other vehicle, a speed of the second preceding other vehicle, a speed of the following other vehicle, and a speed of the vehicle at a virtual position obtained by estimating that the vehicle has made a lane change to between the following other vehicle and the second preceding other vehicle in the adjacent lane; and judging, based on the specified first possible space and the specified second possible space, whether the lane change of the vehicle is possible, wherein the first possible space is a space in which an acceleration/deceleration of the vehicle obtained from the inter-vehicle distance and a relative speed between the first preceding other vehicle and the vehicle has a magnitude equal to or less than a predetermined value, the second possible space is a space in which an acceleration/deceleration of the vehicle at the virtual position obtained from an inter-vehicle distance and a relative speed between the second preceding other vehicle and the vehicle at the virtual position has a magnitude equal to or less than a predetermined value, and in which an acceleration/deceleration of the following other vehicle obtained from an inter-vehicle distance and a relative speed between the following other vehicle and the vehicle at the virtual position has a magnitude equal to or less than a predetermined value.

23. A traveling control method executed by a traveling control apparatus, comprising:

acquiring information outside a vehicle;

controlling traveling of the vehicle based on the acquired information outside the vehicle;

if information of a first following other vehicle that is a vehicle traveling on a traveling lane of the vehicle and is traveling behind the vehicle is acquired as the information outside the vehicle, specifying a first possible space, for which a lane change of the vehicle is possible, based on an inter-vehicle distance between the first following other vehicle and the vehicle, a speed of the first following other vehicle, and a speed of the vehicle;

if information of a second following other vehicle that is a vehicle traveling on an adjacent lane different from the traveling lane of the vehicle and is traveling behind the vehicle and information of a preceding other vehicle traveling ahead the vehicle and the second following other vehicle are acquired as the information outside the vehicle, specifying a second possible space, for which the lane change of the vehicle is possible, based on an inter-vehicle distance between the preceding other vehicle and the second following other vehicle, a speed of the preceding other vehicle, a speed of the second following other vehicle, and a speed of the vehicle at a virtual position obtained by estimating that the vehicle has made a lane change to between the second following other vehicle and the preceding other vehicle in the adjacent lane; and judging, based on the specified first possible space and the specified second possible space, whether the lane change of the vehicle is possible, wherein the first possible space is a space in which an acceleration/deceleration of the vehicle obtained from the inter-vehicle distance and a relative speed between the first following other vehicle and the vehicle has a magnitude equal to or less than a predetermined value, the second possible space is a space in which an acceleration/deceleration of the second following other vehicle obtained from an inter-vehicle distance and a relative speed between the second following other vehicle and the vehicle at the virtual position has a magnitude equal to or less than a predetermined value, and in which an acceleration/deceleration of the vehicle at the virtual position obtained from an inter-vehicle distance and a relative speed between the preceding other vehicle and the vehicle at the virtual position has a magnitude equal to or less than a predetermined value.

24. A traveling control method executed by a traveling control apparatus, comprising:

acquiring information outside a vehicle;

controlling traveling of the vehicle based on the acquired information outside the vehicle;

if information of another vehicle traveling on a traveling lane of the vehicle is acquired as the information outside the vehicle, specifying a first possible space, for which a lane change of the vehicle is possible, based on an inter-vehicle distance between the other vehicle and the vehicle, a speed of the other vehicle, and a speed of the vehicle;

if information of a following other vehicle that is a vehicle traveling on an adjacent lane different from the traveling lane of the vehicle and is traveling behind the vehicle and information of a preceding other vehicle traveling ahead the vehicle and the following other vehicle are acquired as the information outside the vehicle, specifying a second possible space, for which the lane change of the vehicle is possible, based on an inter-vehicle distance between the preceding other vehicle and the following other vehicle, a speed of the preceding other vehicle, and a speed of the following other vehicle, and a speed of the vehicle at a virtual position obtained by estimating that the vehicle has made a lane change to between the following other vehicle and the preceding other vehicle in the adjacent lane; and judging, based on the specified first possible space and the specified second possible space, whether the lane change of the vehicle is possible, wherein the first possible space is a space in which an acceleration/deceleration of the vehicle obtained from the inter-vehicle distance and a relative speed between the other vehicle and the vehicle has a magnitude equal to or less than a predetermined value, the second possible space is a space in which an acceleration/deceleration of the vehicle at the virtual position obtained from an inter-vehicle distance and a relative speed between the preceding other vehicle and the vehicle at the virtual position has a magnitude equal to or less than a predetermined value, and in which an acceleration/deceleration of the following other vehicle obtained from an inter-vehicle distance and a relative speed between the following other vehicle and the vehicle at the virtual position has a magnitude equal to or less than a predetermined value.

25. A non-transitory computer-readable storage medium storing a program configured to cause a computer to function to:

acquire information outside a vehicle;

control traveling of the vehicle based on the acquired information outside the vehicle;

if information of a first preceding other vehicle that is a vehicle traveling on a traveling lane of the vehicle and is traveling ahead the vehicle is acquired as the information outside the vehicle, specify a first possible space, for which a lane change of the vehicle is possible, based on an inter-vehicle distance between the first preceding other vehicle and the vehicle, a speed of the first preceding other vehicle, and a speed of the vehicle;

if information of a following other vehicle that is a vehicle traveling on an adjacent lane different from the traveling lane of the vehicle and is traveling behind the vehicle and information of a second preceding other vehicle traveling ahead the vehicle and the following other vehicle are acquired as the information outside the vehicle, specify a second possible space, for which the lane change of the vehicle is possible, based on an inter-vehicle distance between the second preceding other vehicle and the following other vehicle, a speed of the second preceding other vehicle, a speed of the following other vehicle, and a speed of the vehicle at a virtual position obtained by estimating that the vehicle has made a lane change to between the following other vehicle and the second preceding other vehicle in the adjacent lane; and judge, based on the specified first possible space and the specified second possible space, whether the lane change of the vehicle is possible, wherein the first possible space is a space in which an acceleration/deceleration of the vehicle obtained from the inter-vehicle distance and a relative speed between the first preceding other vehicle and the vehicle has a magnitude equal to or less than a predetermined value, the second possible space is a space in which an acceleration/deceleration of the vehicle at the virtual position obtained from an inter-vehicle distance and a relative speed between the second preceding other vehicle and the vehicle at the virtual position has a magnitude equal to or less than a predetermined value, and in which an acceleration/deceleration of the following other vehicle obtained from an inter-vehicle distance and a relative speed between the following other vehicle and the vehicle at the virtual position has a magnitude equal to or less than a predetermined value.

26. A non-transitory computer-readable storage medium storing a program configured to cause a computer to function to:

acquire information outside a vehicle;

control traveling of the vehicle based on the acquired information outside the vehicle;

if information of a first following other vehicle that is a vehicle traveling on a traveling lane of the vehicle and is traveling behind the vehicle is acquired as the information outside the vehicle, specify a first possible space, for which a lane change of the vehicle is possible, based on an inter-vehicle distance between the first following other vehicle and the vehicle, a speed of the first following other vehicle, and a speed of the vehicle;

if information of a second following other vehicle that is a vehicle traveling on an adjacent lane different from the traveling lane of the vehicle and is traveling behind the vehicle and information of a preceding other vehicle traveling ahead the vehicle and the second following other vehicle are acquired as the information outside the vehicle, specify a second possible space, for which the lane change of the vehicle is possible, based on an inter-vehicle distance between the preceding other vehicle and the second following other vehicle, a speed of the preceding other vehicle, a speed of the second following other vehicle, and a speed of the vehicle at a virtual position obtained by estimating that the vehicle has made a lane change to between the second following other vehicle and the preceding other vehicle in the adjacent lane; and judge, based on the specified first possible space and the specified second possible space, whether the lane change of the vehicle is possible, wherein the first possible space is a space in which an acceleration/deceleration of the vehicle obtained from the inter-vehicle distance and a relative speed between the first following other vehicle and the vehicle has a magnitude equal to or less than a predetermined value, the second possible space is a space in which an acceleration/deceleration of the second following other vehicle obtained from an inter-vehicle distance and a relative speed between the second following other vehicle and the vehicle at the virtual position has a magnitude equal to or less than a predetermined value, and in which an acceleration/deceleration of the vehicle at the virtual position obtained from an inter-vehicle distance and a relative speed between the preceding other vehicle and the vehicle at the virtual position has a magnitude equal to or less than a predetermined value.

27. A non-transitory computer-readable storage medium storing a program configured to cause a computer to function to:

acquire information outside a vehicle;

control traveling of the vehicle based on the acquired information outside the vehicle;

if information of another vehicle traveling on a traveling lane of the vehicle is acquired as the information outside the vehicle, specify a first possible space, for which a lane change of the vehicle is possible, based on an inter-vehicle distance between the other vehicle and the vehicle, a speed of the other vehicle, and a speed of the vehicle;

if information of a following other vehicle that is a vehicle traveling on an adjacent lane different from the traveling lane of the vehicle and is traveling behind the vehicle and information of a preceding other vehicle traveling ahead the vehicle and the following other vehicle are acquired as the information outside the vehicle, specify a second possible space, for which the lane change of the vehicle is possible, based on an inter-vehicle distance between the preceding other vehicle and the following other vehicle, a speed of the preceding other vehicle, and a speed of the following other vehicle, and a speed of the vehicle at a virtual position obtained by estimating that the vehicle has made a lane change to between the following other vehicle and the preceding other vehicle in the adjacent lane; and judge, based on the specified first possible space and the specified second possible space, whether the lane change of the vehicle is possible, wherein the first possible space is a space in which an acceleration/deceleration of the vehicle obtained from the inter-vehicle distance and a relative speed between the other vehicle and the vehicle has a magnitude equal to or less than a predetermined value, the second possible space is a space in which an acceleration/deceleration of the vehicle at the virtual position obtained from an inter-vehicle distance and a relative speed between the preceding other vehicle and the vehicle at the virtual position has a magnitude equal to or less than a predetermined value, and in which an acceleration/deceleration of the following other vehicle obtained from an inter-vehicle distance and a relative speed between the following other vehicle and the vehicle at the virtual position has a magnitude equal to or less than a predetermined value.

\* \* \* \* \*